US012335787B2

(12) United States Patent
Chamarty et al.

(10) Patent No.: US 12,335,787 B2
(45) Date of Patent: Jun. 17, 2025

(54) SCALING OF CLOUD NATIVE RADIO ACCESS NETWORK WORKLOADS IN A CLOUD COMPUTING ENVIRONMENT

(71) Applicant: Rakuten Symphony, Inc., Tokyo (JP)

(72) Inventors: Ravi Chamarty, Tewksbury, MA (US); Prasad Hiremath, Bangalore (IN); Mruthyunjaya Navali, Westford, MA (US); Mahesh Sivapuram, Bangalore (IN); Lokesh Chimbili, Bangalore (IN); Sridhar Bhaskaran, Bangalore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 17/782,039

(22) PCT Filed: May 27, 2022

(86) PCT No.: PCT/US2022/031365
§ 371 (c)(1),
(2) Date: Jun. 2, 2022

(87) PCT Pub. No.: WO2023/191831
PCT Pub. Date: Oct. 5, 2023

(65) Prior Publication Data
US 2024/0163727 A1    May 16, 2024

(30) Foreign Application Priority Data

Apr. 1, 2022 (IN) ............................ 202241020011

(51) Int. Cl.
*H04W 28/18* (2009.01)
*G06F 9/50* (2006.01)
(Continued)

(52) U.S. Cl.
CPC .......... *H04W 28/18* (2013.01); *G06F 9/5011* (2013.01); *H04L 41/0895* (2022.05);
(Continued)

(58) Field of Classification Search
CPC ....... H04W 28/18; H04W 24/08; H04W 4/24; G06F 9/5011; H04L 41/0895; H04L 41/0897; H04L 43/08
(Continued)

(56) References Cited

U.S. PATENT DOCUMENTS

| 2015/0236912 A1* | 8/2015 | Zhang ................. H04L 41/0894 370/338 |
| 2017/0127409 A1 | 5/2017 | Mishra et al. |

(Continued)

OTHER PUBLICATIONS

International Search Report and Written Opinion for Intl. Pat. App. No. PCT/US22/31365 mailed Oct. 19, 2022.
(Continued)

*Primary Examiner* — Mang Hang Yeung
(74) *Attorney, Agent, or Firm* — Sughrue Mion, PLLC

(57) ABSTRACT

A method, an apparatus, and a computer program product for scaling one or more processing resources in a wireless communication system. One or more processing resources being assigned to one or more containers in a plurality of containers of a cloud native radio access network for providing communication to at least one user equipment in a plurality of user equipments are monitored. Based on the monitoring, a determination of whether to change an assignment of one or more processing resources in the plurality of containers is made. Based on the determination, the assignment of one or more processing resources is changed.

15 Claims, 17 Drawing Sheets

(51) Int. Cl.
  *H04L 41/0895*  (2022.01)
  *H04L 41/0897*  (2022.01)
  *H04W 24/08*  (2009.01)
  *H04W 4/24*  (2018.01)

(52) U.S. Cl.
  CPC ......... *H04L 41/0897* (2022.05); *H04W 24/08* (2013.01); *H04W 4/24* (2013.01)

(58) Field of Classification Search
  USPC ........................................................ 370/329
  See application file for complete search history.

(56) References Cited

U.S. PATENT DOCUMENTS

| | | | |
|---|---|---|---|
| 2021/0289385 A1* | 9/2021 | Roessler | G06F 9/5061 |
| 2023/0189077 A1* | 6/2023 | Kwon | H04W 88/085 |
| | | | 370/328 |

OTHER PUBLICATIONS

Prometheus Authors, "Writing exporters," retrieved Mar. 19, 2022 by Wayback Machine <http://web.archive.org/web/20220319170055/http://prometheus.io/docs/instrumenting/writing_exporters/>.

Kubernetes documentation, "Operator pattern," dated Feb. 9, 2022, retrieved Apr. 19, 2022 by Wayback Machine <http://web.archive.org/web/20220419141958/https://kubernetes.io/docs/concepts/extend-kubernetes/operator/>.

\* cited by examiner ved by the Third Generation
SCALING OF CLOUD NATIVE RADIO ACCESS NETWORK WORKLOADS IN A CLOUD COMPUTING ENVIRONMENT

CROSS-REFERENCE TO RELATED APPLICATIONS

The present application claims priority to and is the 35 U.S.C. 371 United States National Phase application based on International Patent Application No. PCT/US2022/031365, filed on May 27, 2022, entitled "Scaling of Cloud Native Radio Access Network Workloads in a Cloud Computing Environment," which claims priority to Indian Patent Appl. No. 202241020011 to Chamarty et al., filed Apr. 1, 2022, and entitled "Scaling of Cloud Native Radio Access Network Workloads in a Cloud Computing Environment", and incorporates their disclosures herein by reference in their entireties.

TECHNICAL FIELD

In some implementations, the current subject matter relates to telecommunications systems, and in particular, to scaling of subscriber capacity in a cloud radio access network (RAN), and in particular, to scaling and/or upgrading of cloud native RAN workloads in a cloud computing environment (such as, for example, Kubernetes computing environment).

BACKGROUND

In today's world, cellular networks provide on-demand communications capabilities to individuals and business entities. Typically, a cellular network is a wireless network that can be distributed over land areas, which are called cells. Each such cell is served by at least one fixed-location transceiver, which is referred to as a cell site or a base station. Each cell can use a different set of frequencies than its neighbor cells in order to avoid interference and provide improved service within each cell. When cells are joined together, they provide radio coverage over a wide geographic area, which enables a large number of mobile telephones, and/or other wireless devices or portable transceivers to communicate with each other and with fixed transceivers and telephones anywhere in the network. Such communications are performed through base stations and are accomplished even if the mobile transceivers are moving through more than one cell during transmission. Major wireless communications providers have deployed such cell sites throughout the world, thereby allowing communications mobile phones and mobile computing devices to be connected to the public switched telephone network and public Internet.

A mobile telephone is a portable telephone that is capable of receiving and/or making telephone and/or data calls through a cell site or a transmitting tower by using radio waves to transfer signals to and from the mobile telephone. In view of a large number of mobile telephone users, current mobile telephone networks provide a limited and shared resource. In that regard, cell sites and handsets can change frequency and use low power transmitters to allow simultaneous usage of the networks by many callers with less interference. Coverage by a cell site can depend on a particular geographical location and/or a number of users that can potentially use the network. For example, in a city, a cell site can have a range of up to approximately ½ mile; in rural areas, the range can be as much as 5 miles; and in some areas, a user can receive signals from a cell site 25 miles away.

The following are examples of some of the digital cellular technologies that are in use by the communications providers: Global System for Mobile Communications ("GSM"), General Packet Radio Service ("GPRS"), cdmaOne, CDMA2000, Evolution-Data Optimized ("EV-DO"), Enhanced Data Rates for GSM Evolution ("EDGE"), Universal Mobile Telecommunications System ("UMTS"), Digital Enhanced Cordless Telecommunications ("DECT"), Digital AMPS ("IS-136/TDMA"), and Integrated Digital Enhanced Network ("iDEN"). The Long Term Evolution, or 4G LTE, which was developed by the Third Generation Partnership Project ("3GPP") standards body, is a standard for a wireless communication of high-speed data for mobile phones and data terminals. A 5G standard is currently being developed and deployed. 3GPP cellular technologies like LTE and 5G NR are evolutions of earlier generation 3GPP technologies like the GSM/EDGE and UMTS/HSPA digital cellular technologies and allows for increasing capacity and speed by using a different radio interface together with core network improvements.

Cellular networks can be divided into radio access networks and core networks. The radio access network (RAN) can include network functions that can handle radio layer communications processing. The core network can include network functions that can handle higher layer communications, e.g., internet protocol (IP), transport layer and applications layer. In some cases, the RAN functions can be split into baseband unit functions and the radio unit functions, where a radio unit connected to a baseband unit via a fronthaul network, for example, can be responsible for lower layer processing of a radio physical layer while a baseband unit can be responsible for the higher layer radio protocols, e.g., MAC, RLC, etc.

Conventional radio access networks (RANs) are typically configured for peak wireless subscriber processing capacity demands. When processing capacity falls below a predetermined peak, RAN's compute resources become under-utilized. Cloud native RANs use cloud technologies to dynamically scale-in (or reduce) and scale-out (or increase) the processing capacity required as the subscriber demand decreases or increases. To fully utilize the cloud native dynamic scaling, a determination of how to automatically scale subscriber context handling pods in cloud computing clusters as the subscriber capacity increases, as well as performance of upgrades of such clusters/pods in the cloud native RAN to avoid service interruption during upgrades may be needed.

SUMMARY

In some implementations, the current subject matter relates to a computer implemented method for scaling one or more resources in a wireless communication system. The method may include monitoring one or more processing resources being assigned to one or more containers in a plurality of containers of a cloud native radio access network for providing communication to at least one user equipment in a plurality of user equipments, determining, based on the monitoring, whether to change an assignment of one or more processing resources in the plurality of containers, and changing, based on the determining, the assignment of one or more processing resources.

In some implementations, the current subject matter can include one or more of the following optional features. In some implementations, the plurality of containers may be configured to operate in a clustered computing environment (e.g., Kubernetes).

In some implementations, at least one of the monitoring, the determining, and the changing may be performed by at least one base station in a wireless communication system. The base station may include at least one of the following: a base station, an eNodeB base station, a gNodeB base station, a wireless base station, a wireless access point, and any combination thereof. The base station may be a base station operating in at least one of the following communications systems: a long term evolution communications system, a new radio communications system, a wireless communication system, and any combination thereof. The base station may include at least one centralized unit, the centralized unit include at least one of: a control plane component, a user plane component, and any combination thereof.

In some implementations, one or more user equipments in the plurality of user equipments may be associated with a radio resource control (RRC) status. The RRC status may include at least one of the following: an RRC-inactive status, RRC-IDLE status, an RRC connected status, and any combination thereof.

In some implementations, the monitoring may include monitoring one or more metrics associated with the one or more processing resources. The metrics may include at least one of the following: a number of user equipments being processed by at least one container, a throughput associated with processing of at least one user equipment by at least one container, one or more data radio bearers associated with at least one user equipment, and any combination thereof.

In some implementations, at least one container may be associated with at least one of: at least one control plane component and at least user plane component of a centralized unit of a base station.

In some implementations, the method may include upgrading one or more processing resources using one or more resource definitions associated with one or more upgrades. Upgrading may include executing one or more upgrades using one or more upgrade sequences.

In some implementations, the changing may include changing the assignment of one or more processing resources using one or more resource definitions associated with one or more control plane and user plane components of a centralized unit of a base station.

In some implementations, the changing may include executing one or more changing of the assignment of the one or more processing resources operations using one or more changing sequences.

In some implementations, the method may also include deploying one or more upgraded resources, monitoring the deployed upgraded resources using one or more key performance indicators, and rolling back one or more deployed upgrades to the processing resources upon determining that the deployed upgraded processing resources do not meet one or more key performance indicators.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 1b illustrates further detail of the exemplary LTE system shown in FIG. 1a;

FIG. 1c illustrates additional detail of the evolved packet core of the exemplary LTE system shown in FIG. 1a;

FIG. 1d illustrates an exemplary evolved Node B of the exemplary LTE system shown in FIG. 1a;

DETAILED DESCRIPTION

Figure 1A:
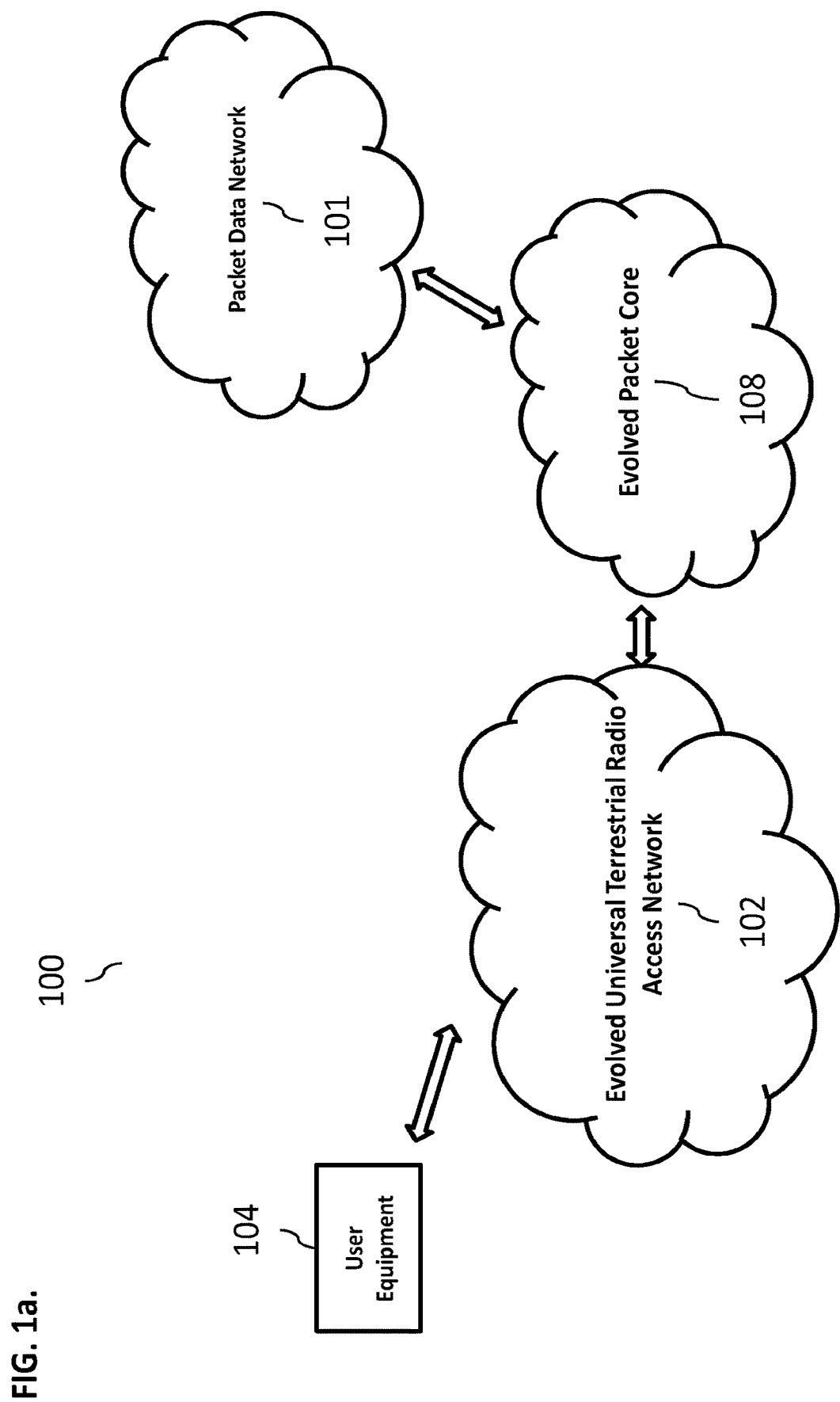
FIG. 1a illustrates an exemplary conventional long term evolution ("LTE") communications system.

The current subject matter can provide for systems and methods that can be implemented in wireless communications systems. Such systems can include various wireless communications systems, including 5G New Radio communications systems, long term evolution communication systems, etc.

In some implementations, the current subject matter relates to a system for performing automatic scaling out and/or scaling in of mobile subscribers in clustered cloud computing radio access network environment. The system may include a container monitoring system and/or a customer metrics server that may be configured to query and/or obtain capacity related metrics from gNB/eNB/ng-eNB CU-CP and/or CU-UP components associated with one or more mobile subscribers that are being handled by one or more pods in the clustered computing environment.

The metrics may include at least one of the following: a number of RRC connected subscribers associated with a particular pod, a number of RRC connected and RRC inactive subscribers associated with a particular pod, a weighted average of RRC subscribers and RRC inactive subscribers associated with a particular pod, an average throughput, a number of data radio bearers (DRBs). The metrics may be exported to an API server associated with a computing cluster, where a horizontal pod autoscaler (HPA) may query such metrics for the purposes of determining a particular scale in and/or scale out policy. The policy may be used to determine how to scale in (e.g., reduce) and/or scale out (e.g., increase) subscriber handling pods in control and/or user planes of centralized units of eNB and/or gNB.

In some implementations, the current subject matter relates to a system for performing a sequenced upgrade of pods in a clustered cloud radio access network environment. The system may include a custom resource definition (CRD) to identify the cloud resources (pods) for a rolling upgrade. One or more custom operators that monitor and sequence the upgrade of resources identified in CRD may be used. The system may be configured to deploy the upgraded resources (pods) and monitor one or more key performance indicators (KPIs) of the resources after upgrade. The custom operators may be configured to implement a rolling back of resources if the KPIs are not met.

One or more aspects of the current subject matter can be incorporated into transmitter and/or receiver components of base stations (e.g., gNodeBs, eNodeBs, etc.) in such communications systems. The following is a general discussion of long-term evolution communications systems and 5G New Radio communication systems.

I. Long Term Evolution Communications System

FIGS. 1a-c and 2 illustrate an exemplary conventional long-term evolution ("LTE") communication system 100 along with its various components. An LTE system or a 4G LTE, as it is commercially known, is governed by a standard for wireless communication of high-speed data for mobile telephones and data terminals. The standard is an evolution of the GSM/EDGE ("Global System for Mobile Communications"/"Enhanced Data rates for GSM Evolution") as well as UMTS/HSPA ("Universal Mobile Telecommunications System"/"High Speed Packet Access") network technologies. The standard was developed by the 3GPP ("3rd Generation Partnership Project").

Figure 1B:
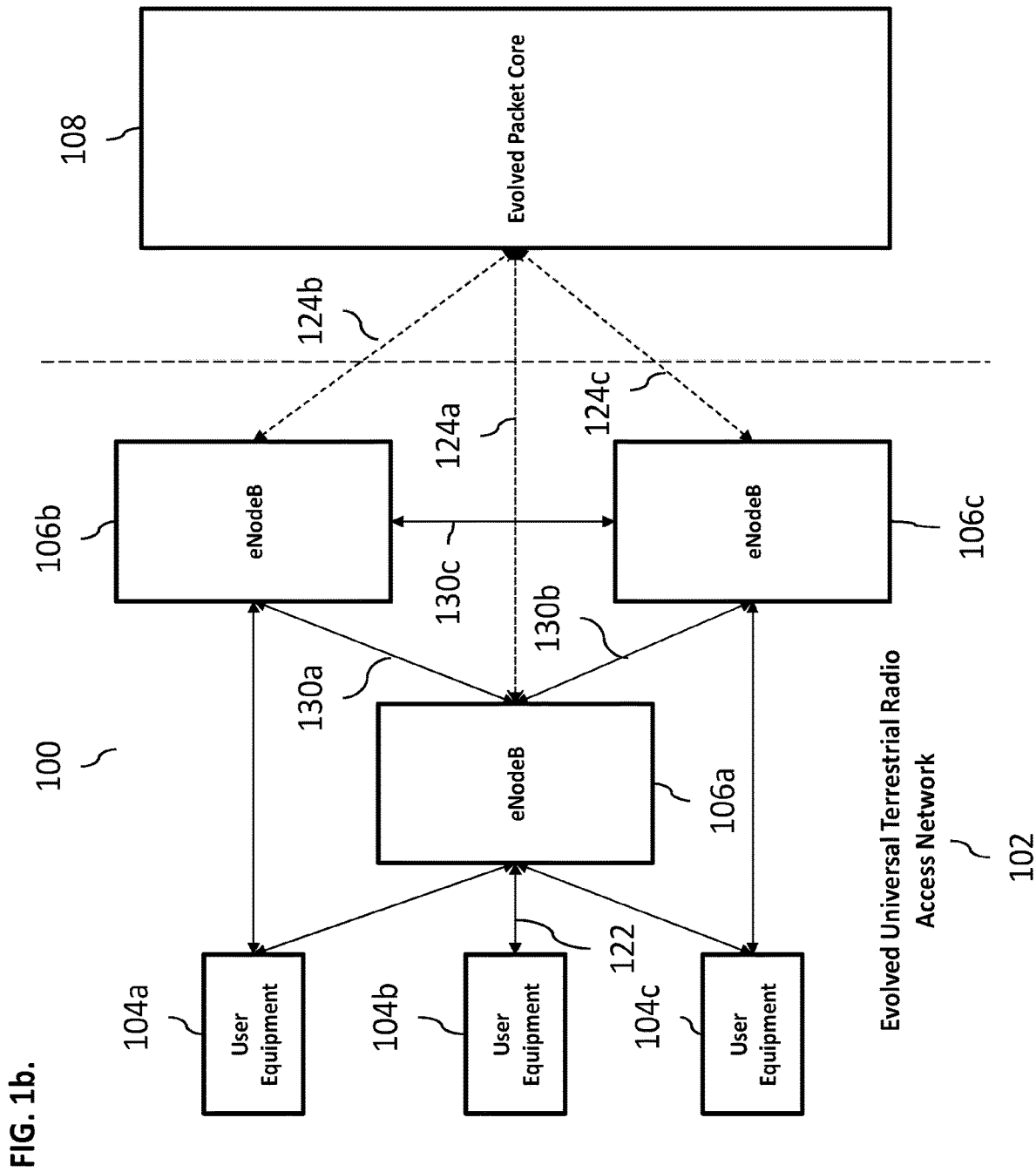

As shown in FIG. 1a, the system 100 can include an evolved universal terrestrial radio access network ("EUTRAN") 102, an evolved packet core ("EPC") 108, and a packet data network ("PDN") 101, where the EUTRAN 102 and EPC 108 provide communication between a user equipment 104 and the PDN 101. The EUTRAN 102 can include a plurality of evolved node B's ("eNodeB" or "ENODEB" or "enodeb" or "eNB") or base stations 106 (a, b, c) (as shown in FIG. 1b) that provide communication capabilities to a plurality of user equipment 104(a, b, c). The user equipment 104 can be a mobile telephone, a smartphone, a tablet, a personal computer, a personal digital assistant ("PDA"), a server, a data terminal, and/or any other type of user equipment, and/or any combination thereof. The user equipment 104 can connect to the EPC 108 and eventually, the PDN 101, via any eNodeB 106. Typically, the user equipment 104 can connect to the nearest, in terms of distance, eNodeB 106. In the LTE system 100, the EUTRAN 102 and EPC 108 work together to provide connectivity, mobility and services for the user equipment 104.

Figure 1C:
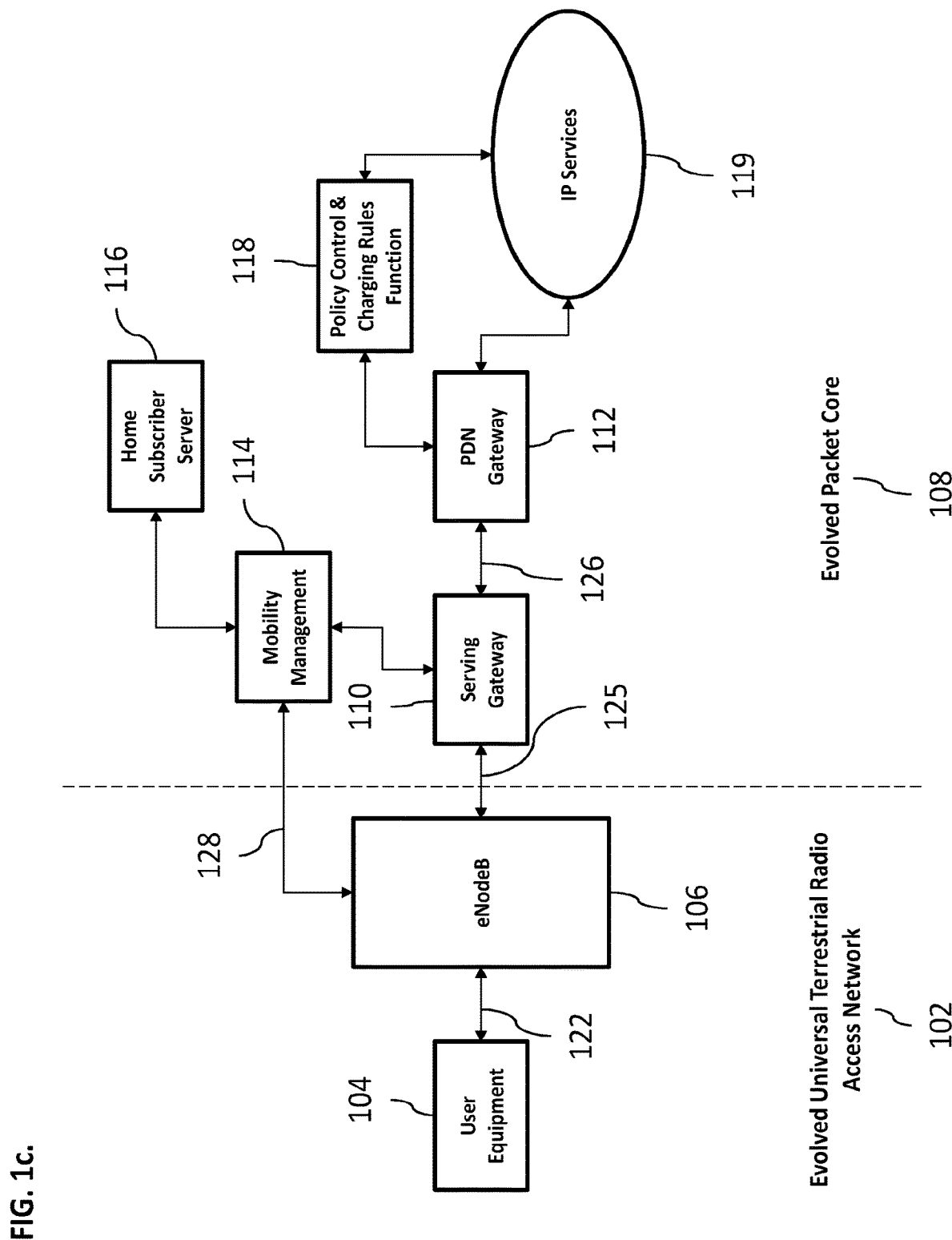

FIG. 1b illustrates further detail of the network 100 shown in FIG. 1a. As stated above, the EUTRAN 102 includes a plurality of eNodeBs 106, also known as cell sites. The eNodeBs 106 provides radio functions and performs key control functions including scheduling of air link resources or radio resource management, active mode mobility or handover, and admission control for services. The eNodeBs 106 are responsible for selecting which mobility management entities (MMEs, as shown in FIG. 1c) will serve the user equipment 104 and for protocol features like header compression and encryption. The eNodeBs 106 that make up an EUTRAN 102 collaborate with one another for radio resource management and handover.

Communication between the user equipment 104 and the eNodeB 106 occurs via an air interface 122 (also known as "LTE-Uu" interface). As shown in FIG. 1b, the air interface 122 provides communication between user equipment 104b and the eNodeB 106a. The air interface 122 uses Orthogonal Frequency Division Multiple Access ("OFDMA") and Single Carrier Frequency Division Multiple Access ("SC-FDMA"), an OFDMA variant, on the downlink and uplink respectively. OFDMA allows use of multiple known antenna techniques, such as, Multiple Input Multiple Output ("MIMO").

The air interface 122 uses various protocols, which include a radio resource control ("RRC") for signaling between the user equipment 104 and eNodeB 106 and non-access stratum ("NAS") for signaling between the user equipment 104 and MME (as shown in FIG. 1c). In addition to signaling, user traffic is transferred between the user equipment 104 and eNodeB 106. Both signaling and traffic in the system 100 are carried by physical layer ("PHY") channels.

Multiple eNodeBs 106 can be interconnected with one another using an X2 interface 130(a, b, c). As shown in FIG. 1a, X2 interface 130a provides interconnection between eNodeB 106a and eNodeB 106b; X2 interface 130b provides interconnection between eNodeB 106a and eNodeB 106c; and X2 interface 130c provides interconnection between eNodeB 106b and eNodeB 106c. The X2 interface can be established between two eNodeBs in order to provide an exchange of signals, which can include a load- or interference-related information as well as handover-related information. The eNodeBs 106 communicate with the evolved packet core 108 via an S1 interface 124(*a*, *b*, *c*). The S1 interface 124 can be split into two interfaces: one for the control plane (shown as control plane interface (S1-MME interface) 128 in FIG. 1*c*) and the other for the user plane (shown as user plane interface (S1-U interface) 125 in FIG. 1*c*).

The EPC 108 establishes and enforces Quality of Service ("QoS") for user services and allows user equipment 104 to maintain a consistent internet protocol ("IP") address while moving. It should be noted that each node in the network 100 has its own IP address. The EPC 108 is designed to interwork with legacy wireless networks. The EPC 108 is also designed to separate control plane (i.e., signaling) and user plane (i.e., traffic) in the core network architecture, which allows more flexibility in implementation, and independent scalability of the control and user data functions.

The EPC 108 architecture is dedicated to packet data and is shown in more detail in FIG. 1*c*. The EPC 108 includes a serving gateway (S-GW) 110, a PDN gateway (P-GW) 112, a mobility management entity ("MME") 114, a home subscriber server ("HSS") 116 (a subscriber database for the EPC 108), and a policy control and charging rules function ("PCRF") 118. Some of these (such as S-GW, P-GW, MME, and HSS) are often combined into nodes according to the manufacturer's implementation.

The S-GW 110 functions as an IP packet data router and is the user equipment's bearer path anchor in the EPC 108. Thus, as the user equipment moves from one eNodeB 106 to another during mobility operations, the S-GW 110 remains the same and the bearer path towards the EUTRAN 102 is switched to talk to the new eNodeB 106 serving the user equipment 104. If the user equipment 104 moves to the domain of another S-GW 110, the MME 114 will transfer all of the user equipment's bearer paths to the new S-GW. The S-GW 110 establishes bearer paths for the user equipment to one or more P-GWs 112. If downstream data are received for an idle user equipment, the S-GW 110 buffers the downstream packets and requests the MME 114 to locate and reestablish the bearer paths to and through the EUTRAN 102.

The P-GW 112 is the gateway between the EPC 108 (and the user equipment 104 and the EUTRAN 102) and PDN 101 (shown in FIG. 1*a*). The P-GW 112 functions as a router for user traffic as well as performs functions on behalf of the user equipment. These include IP address allocation for the user equipment, packet filtering of downstream user traffic to ensure it is placed on the appropriate bearer path, enforcement of downstream QoS, including data rate. Depending upon the services a subscriber is using, there may be multiple user data bearer paths between the user equipment 104 and P-GW 112. The subscriber can use services on PDNs served by different P-GWs, in which case the user equipment has at least one bearer path established to each P-GW 112. During handover of the user equipment from one eNodeB to another, if the S-GW 110 is also changing, the bearer path from the P-GW 112 is switched to the new S-GW.

The MME 114 manages user equipment 104 within the EPC 108, including managing subscriber authentication, maintaining a context for authenticated user equipment 104, establishing data bearer paths in the network for user traffic, and keeping track of the location of idle mobiles that have not detached from the network. For idle user equipment 104 that needs to be reconnected to the access network to receive downstream data, the MME 114 initiates paging to locate the user equipment and re-establishes the bearer paths to and through the EUTRAN 102. MME 114 for a particular user equipment 104 is selected by the eNodeB 106 from which the user equipment 104 initiates system access. The MME is typically part of a collection of MMEs in the EPC 108 for the purposes of load sharing and redundancy. In the establishment of the user's data bearer paths, the MME 114 is responsible for selecting the P-GW 112 and the S-GW 110, which will make up the ends of the data path through the EPC 108.

The PCRF 118 is responsible for policy control decision-making, as well as for controlling the flow-based charging functionalities in the policy control enforcement function ("PCEF"), which resides in the P-GW 110. The PCRF 118 provides the QoS authorization (QoS class identifier ("QCI") and bit rates) that decides how a certain data flow will be treated in the PCEF and ensures that this is in accordance with the user's subscription profile.

As stated above, the IP services 119 are provided by the PDN 101 (as shown in FIG. 1*a*).

Figure 1D:
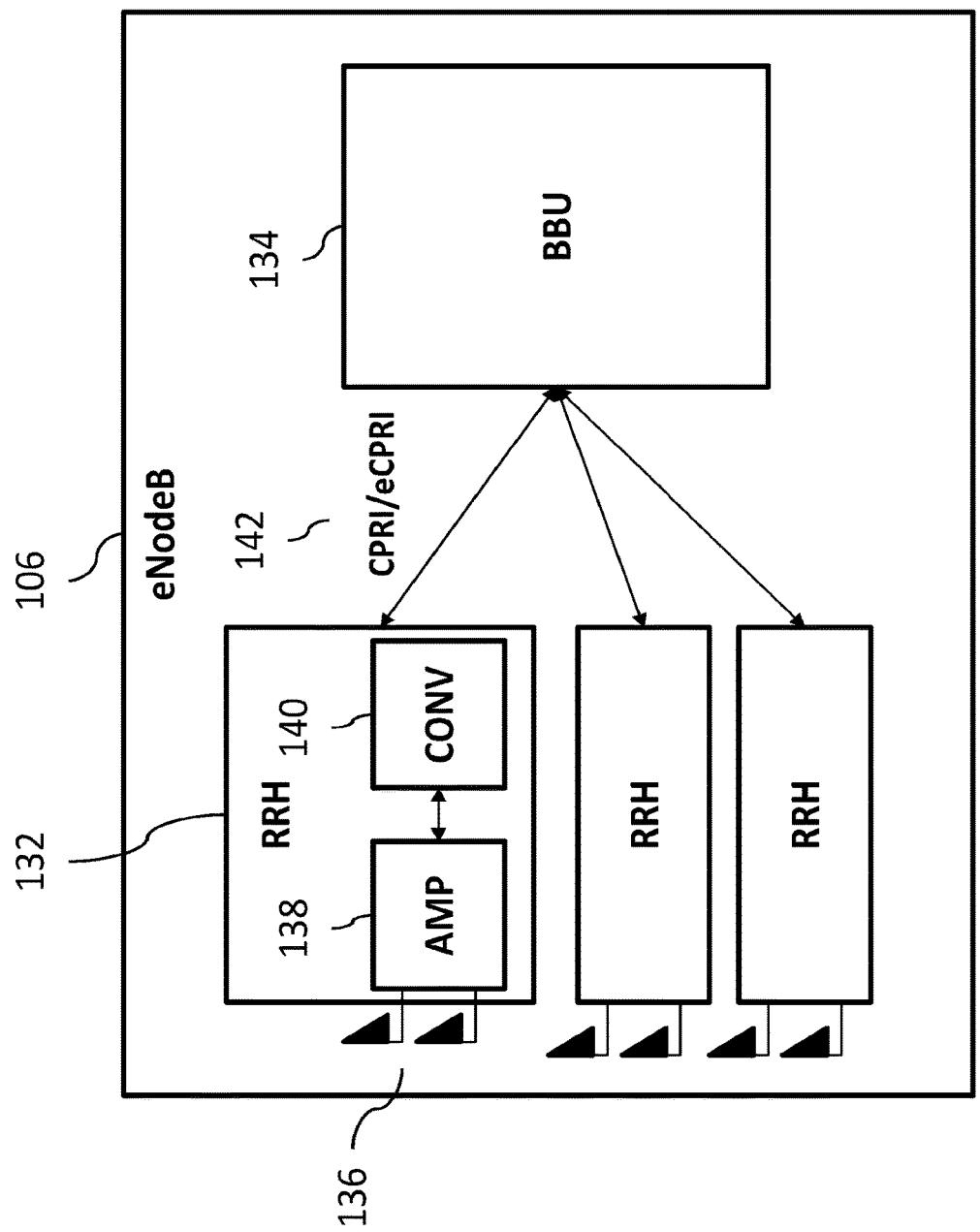

FIG. 1*d* illustrates an exemplary structure of eNodeB 106. The eNodeB 106 can include at least one remote radio head ("RRH") 132 (typically, there can be three RRH 132) and a baseband unit ("BBU") 134. The RRH 132 can be connected to antennas 136. The RRH 132 and the BBU 134 can be connected using an optical interface that is compliant with common public radio interface ("CPRI")/enhanced CPRI ("eCPRI") 142 standard specification either using RRH specific custom control and user plane framing methods or using O-RAN Alliance compliant Control and User plane framing methods. The operation of the eNodeB 106 can be characterized using the following standard parameters (and specifications): radio frequency band (Band4, Band9, Band17, etc.), bandwidth (5, 10, 15, 20 MHz), access scheme (downlink: OFDMA; uplink: SC-OFDMA), antenna technology (Single user and multi user MIMO; Uplink: Single user and multi user MIMO), number of sectors (6 maximum), maximum transmission rate (downlink 150 Mb/s; uplink: 50 Mb/s), S1/X2 interface (1000Base-SX, 1000Base-T), and mobile environment (up to 350 km/h). The BBU 134 can be responsible for digital baseband signal processing, termination of S1 line, termination of X2 line, call processing and monitoring control processing. IP packets that are received from the EPC 108 (not shown in FIG. 1*d*) can be modulated into digital baseband signals and transmitted to the RRH 132. Conversely, the digital baseband signals received from the RRH 132 can be demodulated into IP packets for transmission to EPC 108.

The RRH 132 can transmit and receive wireless signals using antennas 136. The RRH 132 can convert (using converter ("CONN") 140) digital baseband signals from the BBU 134 into radio frequency ("RF") signals and power amplify (using amplifier ("AMP") 138) them for transmission to user equipment 104 (not shown in FIG. 1*d*). Conversely, the RF signals that are received from user equipment 104 are amplified (using AMP 138) and converted (using CONV 140) to digital baseband signals for transmission to the BBU 134.

Figure 2:
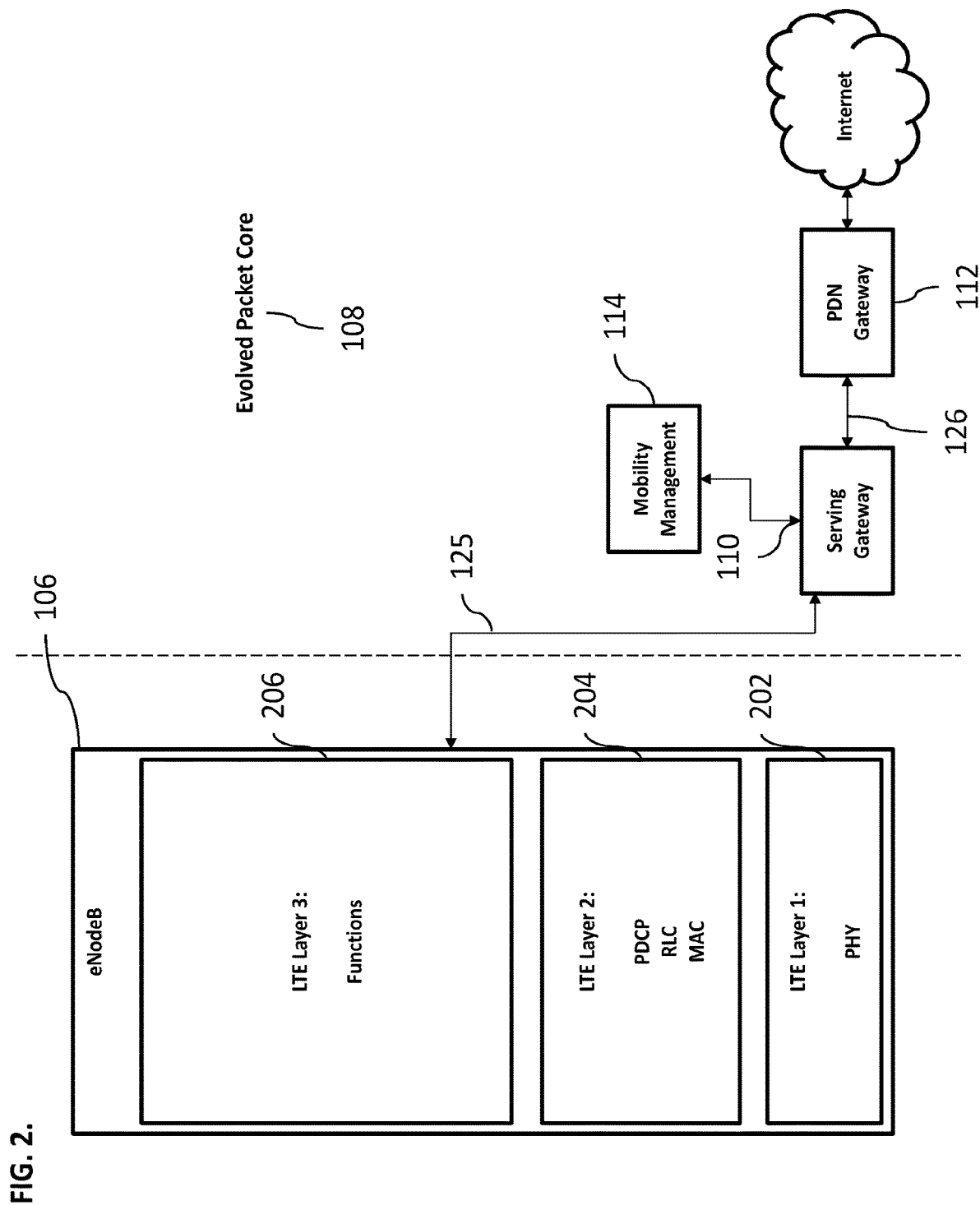
FIG. 2 illustrates further detail of an evolved Node B shown in FIGS. 1a-d.

FIG. 2 illustrates an additional detail of an exemplary eNodeB 106. The eNodeB 106 includes a plurality of layers: LTE layer 1 202, LTE layer 2 204, and LTE layer 3 206. The LTE layer 1 includes a physical layer ("PHY"). The LTE layer 2 includes a medium access control ("MAC"), a radio link control ("RLC"), a packet data convergence protocol ("PDCP"). The LTE layer 3 includes various functions and protocols, including a radio resource control ("RRC"), a dynamic resource allocation, eNodeB measurement configuration and provision, a radio admission control, a connection mobility control, and radio resource management ("RRM"). The RLC protocol is an automatic repeat request ("ARQ") fragmentation protocol used over a cellular air interface. The RRC protocol handles control plane signaling of LTE layer 3 between the user equipment and the EUTRAN. RRC includes functions for connection establishment and release, broadcast of system information, radio bearer establishment/reconfiguration and release, RRC connection mobility procedures, paging notification and release, and outer loop power control. The PDCP performs IP header compression and decompression, transfer of user data and maintenance of sequence numbers for Radio Bearers. The BBU 134, shown in FIG. 1d, can include LTE layers L1-L3.

One of the primary functions of the eNodeB 106 is radio resource management, which includes scheduling of both uplink and downlink air interface resources for user equipment 104, control of bearer resources, and admission control. The eNodeB 106, as an agent for the EPC 108, is responsible for the transfer of paging messages that are used to locate mobiles when they are idle. The eNodeB 106 also communicates common control channel information over the air, header compression, encryption and decryption of the user data sent over the air, and establishing handover reporting and triggering criteria. As stated above, the eNodeB 106 can collaborate with other eNodeB 106 over the X2 interface for the purposes of handover and interference management. The eNodeBs 106 communicate with the EPC's MME via the S1-MME interface and to the S-GW with the S1-U interface. Further, the eNodeB 106 exchanges user data with the S-GW over the S1-U interface. The eNodeB 106 and the EPC 108 have a many-to-many relationship to support load sharing and redundancy among MMEs and S-GWs. The eNodeB 106 selects an MME from a group of MMEs so the load can be shared by multiple MMEs to avoid congestion.

II. 5G NR Wireless Communications Networks

In some implementations, the current subject matter relates to a 5G new radio ("NR") communications system. The 5G NR is a next telecommunications standard beyond the 4G/IMT-Advanced standards. 5G networks offer at higher capacity than current 4G, allow higher number of mobile broadband users per area unit, and allow consumption of higher and/or unlimited data quantities in gigabyte per month and user. This can allow users to stream high-definition media many hours per day using mobile devices, even when it is not possible to do so with Wi-Fi networks. 5G networks have an improved support of device-to-device communication, lower cost, lower latency than 4G equipment and lower battery consumption, etc. Such networks have data rates of tens of megabits per second for a large number of users, data rates of 100 Mb/s for metropolitan areas, 1 Gb/s simultaneously to users within a confined area (e.g., office floor), a large number of simultaneous connections for wireless sensor networks, an enhanced spectral efficiency, improved coverage, enhanced signaling efficiency, 1-10 ms latency, reduced latency compared to existing systems.

Figure 3:
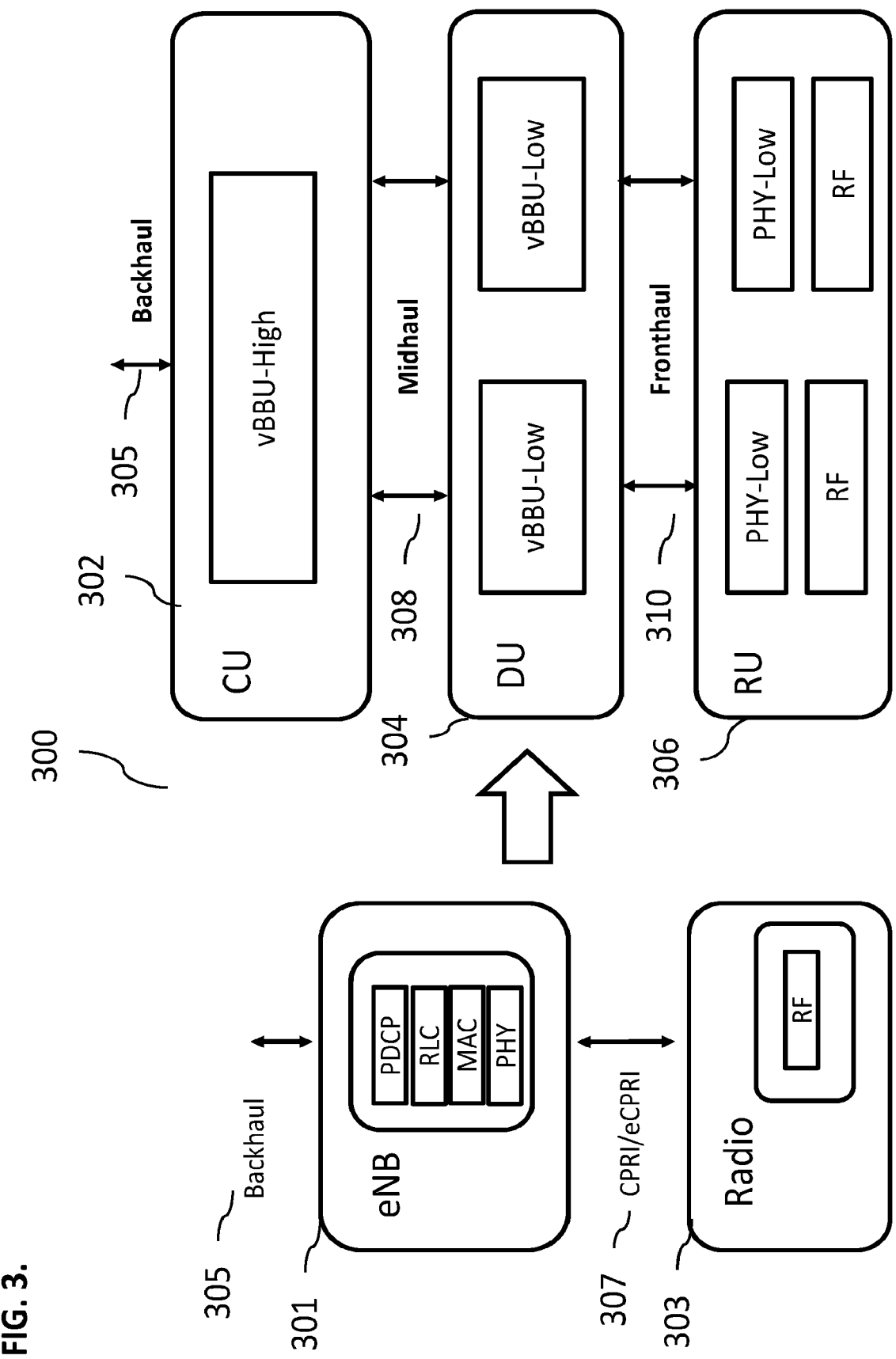
FIG. 3 illustrates an exemplary virtual radio access network, according to some implementations of the current subject matter.

FIG. 3 illustrates an exemplary virtual radio access network 300. The network 300 can provide communications between various components, including a base station (e.g., eNodeB, gNodeB) 301, a radio equipment 307, a centralized unit 302, a digital unit 304, and a radio device 306. The components in the system 300 can be communicatively coupled to a core using a backhaul link 305. A centralized unit ("CU") 302 can be communicatively coupled to a distributed unit ("DU") 304 using a midhaul connection 308. The radio frequency ("RU") components 306 can be communicatively coupled to the DU 304 using a fronthaul connection 310.

In some implementations, the CU 302 can provide intelligent communication capabilities to one or more DU units 308. The units 302, 304 can include one or more base stations, macro base stations, micro base stations, remote radio heads, etc. and/or any combination thereof.

In lower layer split architecture environment, a CPRI bandwidth requirement for NR can be 100s of Gb/s. CPRI compression can be implemented in the DU and RU (as shown in FIG. 3). In 5G communications systems, compressed CPRI over Ethernet frame is referred to as eCPRI and is the recommended fronthaul network. The architecture can allow for standardization of fronthaul/midhaul, which can include a higher layer split (e.g., Option 2 or Option 3-1 (Upper/Lower RLC split architecture)) and fronthaul with L1-split architecture (Option 7).

In some implementations, the lower layer-split architecture (e.g., Option 7) can include a receiver in the uplink, joint processing across multiple transmission points (TPs) for both DL/UL, and transport bandwidth and latency requirements for ease of deployment. Further, the current subject matter's lower layer-split architecture can include a split between cell-level and user-level processing, which can include cell-level processing in remote unit ("RU") and user-level processing in DU. Further, using the current subject matter's lower layer-split architecture, frequency-domain samples can be transported via Ethernet fronthaul, where the frequency-domain samples can be compressed for reduced fronthaul bandwidth.

Figure 4:
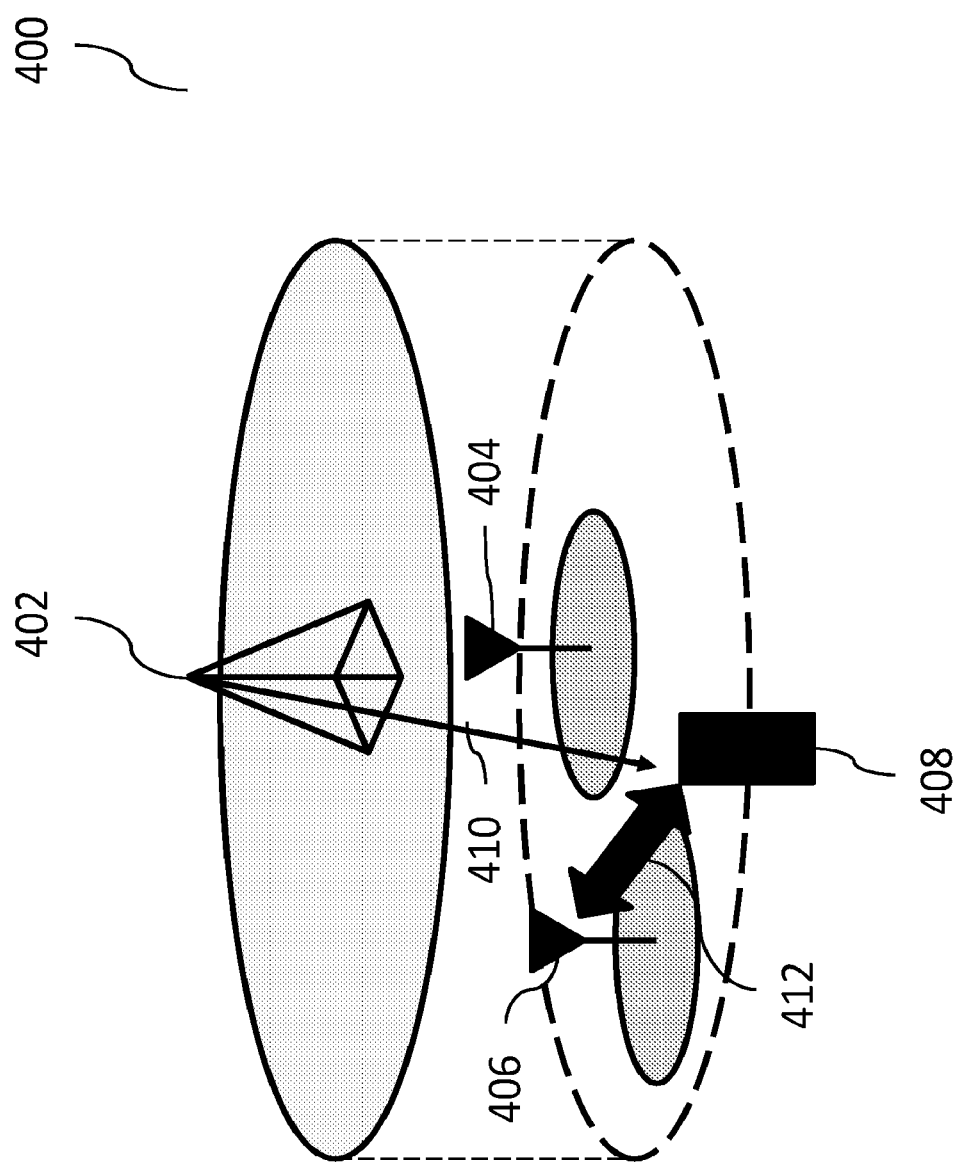
FIG. 4 illustrates an exemplary 3GPP split architecture to provide its users with use of higher frequency bands.

FIG. 4 illustrates an exemplary communications system 400 that can implement a 5G technology and can provide its users with use of higher frequency bands (e.g., greater than 10 GHz). The system 400 can include a macro cell 402 and small cells 404 and 406.

A mobile device 408 can be configured to communicate with one or more of the small cells 404, 406. The system 400 can allow splitting of control planes (C-plane) and user planes (U-plane) between the macro cell 402 and small cells 404, 406, where the C-plane and U-plane are utilizing different frequency bands. In particular, the small cells 402, 404 can be configured to utilize higher frequency bands when communicating with the mobile device 408. The macro cell 402 can utilize existing cellular bands for C-plane communications. The mobile device 408 can be communicatively coupled via U-plane 412, where the small cell (e.g., small cell 406) can provide higher data rate and more flexible/cost/energy efficient operations. The macro cell 402, via C-plane 410, can maintain good connectivity and mobility. Further, in some cases, LTE and NR can be transmitted on the same frequency.

Figure 5A:
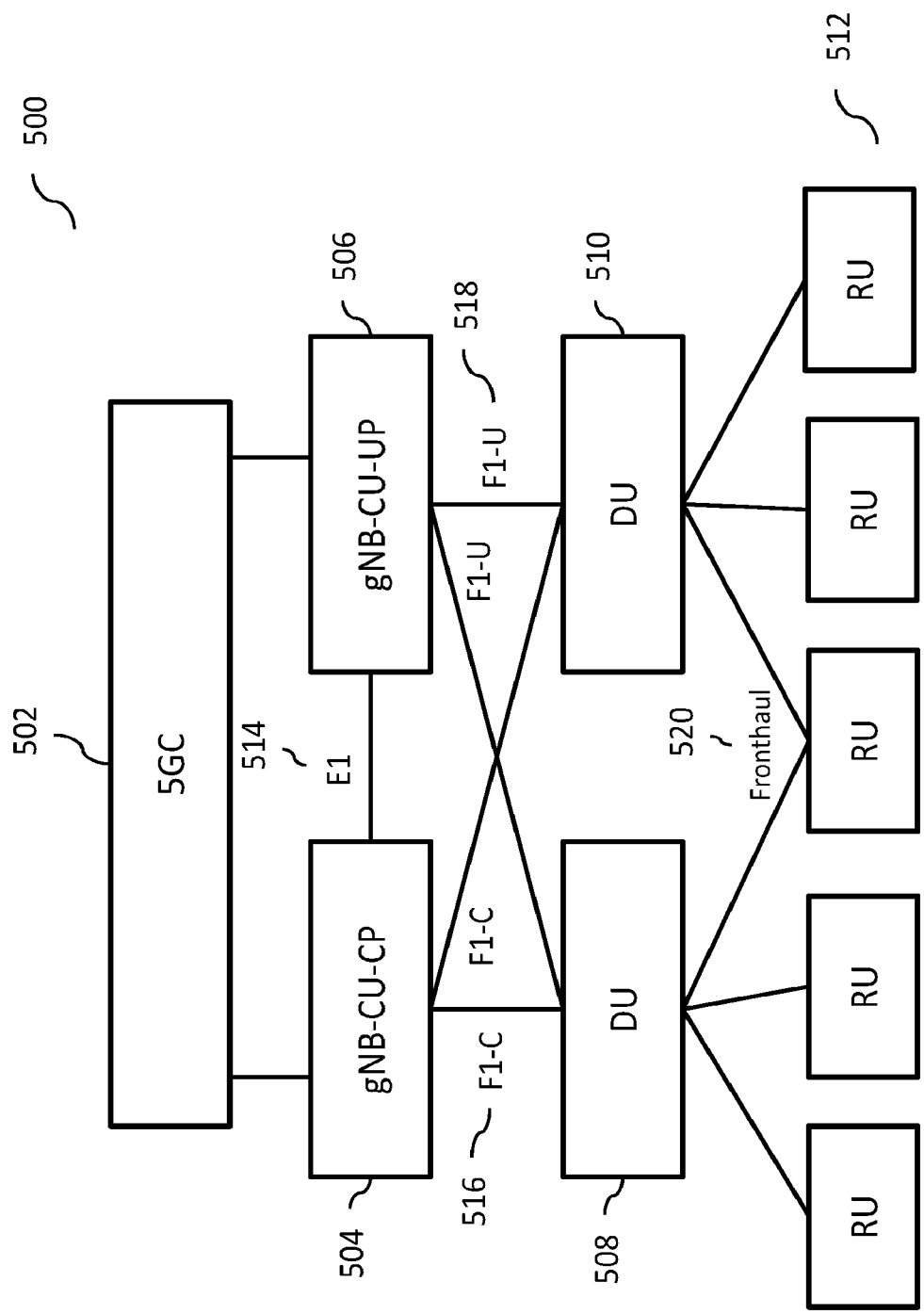
FIG. 5a illustrates an exemplary 5G wireless communication system.

FIG. 5a illustrates an exemplary 5G wireless communication system 500, according to some implementations of the current subject matter. The system 500 can be configured to have a lower layer split architecture in accordance with Option 7-2. The system 500 can include a core network 502 (e.g., 5G Core) and one or more gNodeBs (or gNBs), where the gNBs can have a centralized unit gNB-CU. The gNB-CU can be logically split into control plane portion, gNB-CU-CP, 504 and one or more user plane portions, gNB-CU-UP, 506. The control plane portion 504 and the user plane portion 506 can be configured to be communicatively coupled using an E1 communication interface 514 (as specified in the 3GPP Standard). The control plane portion 504 can be configured to be responsible for execution of the RRC and PDCP protocols of the radio stack.

The control plane and user plane portions 504, 506 of the centralized unit of the gNB can be configured to be communicatively coupled to one or more distributed units (DU) 508, 510, in accordance with the higher layer split architecture. The distributed units 508, 510 can be configured to execute RLC, MAC and upper part of PHY layers protocols of the radio stack. The control plane portion 504 can be configured to be communicatively coupled to the distributed units 508, 510 using F1-C communication interfaces 516, and the user plane portions 506 can be configured to be communicatively coupled to the distributed units 508, 510 using F1-U communication interfaces 518. The distributed units 508, 510 can be coupled to one or more remote radio units (RU) 512 via a fronthaul network 520 (which may include one or switches, links, etc.), which in turn communicate with one or more user equipment (not shown in FIG. 5a). The remote radio units 512 can be configured to execute a lower part of the PHY layer protocols as well as provide antenna capabilities to the remote units for communication with user equipments (similar to the discussion above in connection with FIGS. 1a-2).

Figure 5B:
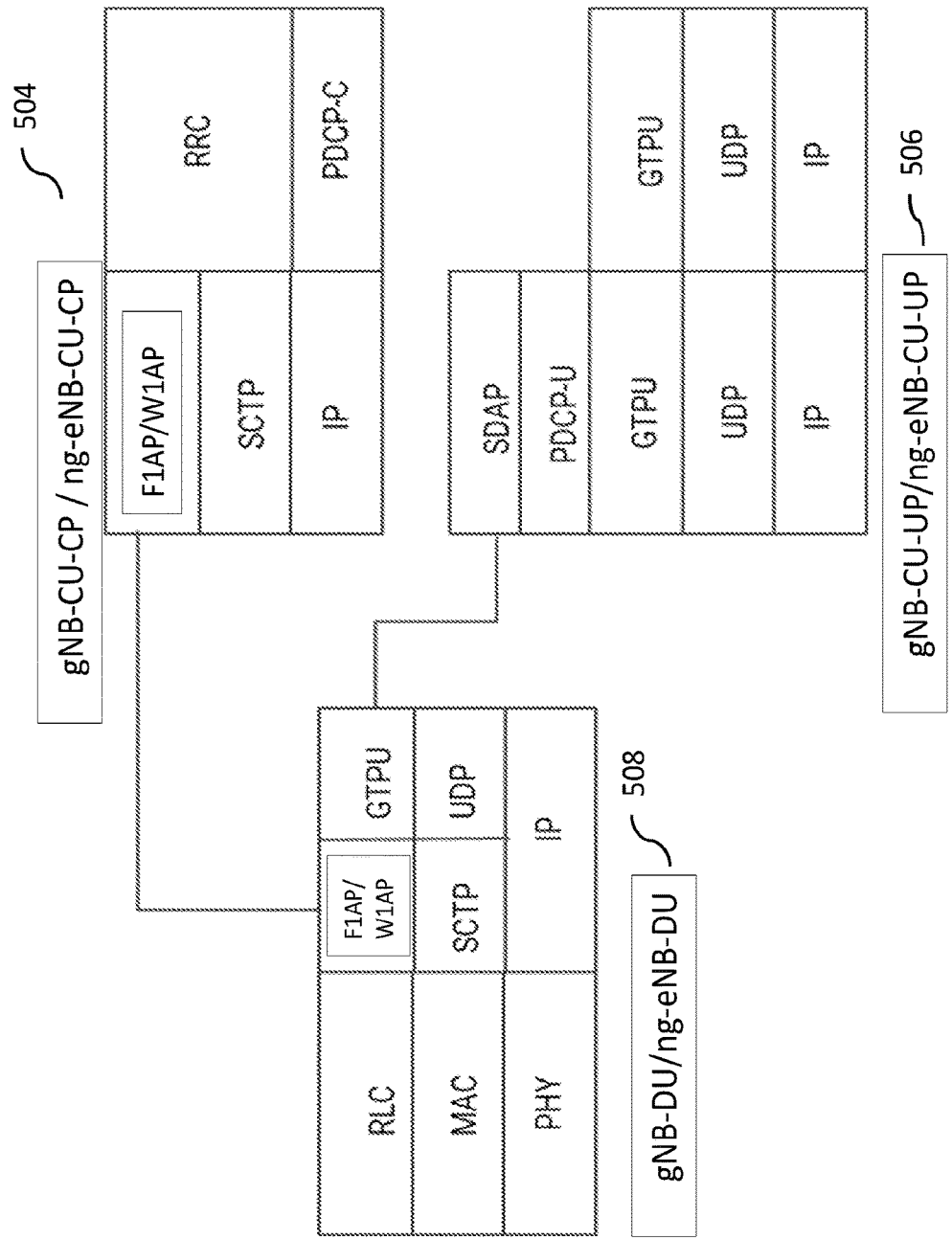
FIG. 5b illustrates an exemplary layer architecture of the split gNB and/or a split ng-eNB (e.g., next generation eNB that may be connected to 5GC)

FIG. 5b illustrates an exemplary layer architecture 530 of the split gNB. The architecture 530 can be implemented in the communications system 500 shown in FIG. 5a, which can be configured as a virtualized disaggregated radio access network (RAN) architecture, whereby layers L1, L2, L3 and radio processing can be virtualized and disaggregated in the centralized unit(s), distributed unit(s) and radio unit(s). As shown in FIG. 5b, the gNB-DU 508 can be communicatively coupled to the gNB-CU-CP control plane portion 504 (also shown in FIG. 5a) and gNB-CU-UP user plane portion 506. Each of components 504, 506, 508 can be configured to include one or more layers.

The gNB-DU 508 can include RLC, MAC, and PHY layers as well as various communications sublayers. These can include an F1 application protocol (F1-AP) sublayer, a GPRS tunneling protocol (GTPU) sublayer, a stream control transmission protocol (SCTP) sublayer, a user datagram protocol (UDP) sublayer and an internet protocol (IP) sublayer. As stated above, the distributed unit 508 may be communicatively coupled to the control plane portion 504 of the centralized unit, which may also include F1-AP, SCTP, and IP sublayers as well as radio resource control, and PDCP-control (PDCP-C) sublayers. Moreover, the distributed unit 508 may also be communicatively coupled to the user plane portion 506 of the centralized unit of the gNB. The user plane portion 506 may include service data adaptation protocol (SDAP), PDCP-user (PDCP-U), GTPU, UDP and IP sublayers.

Figure 5C:
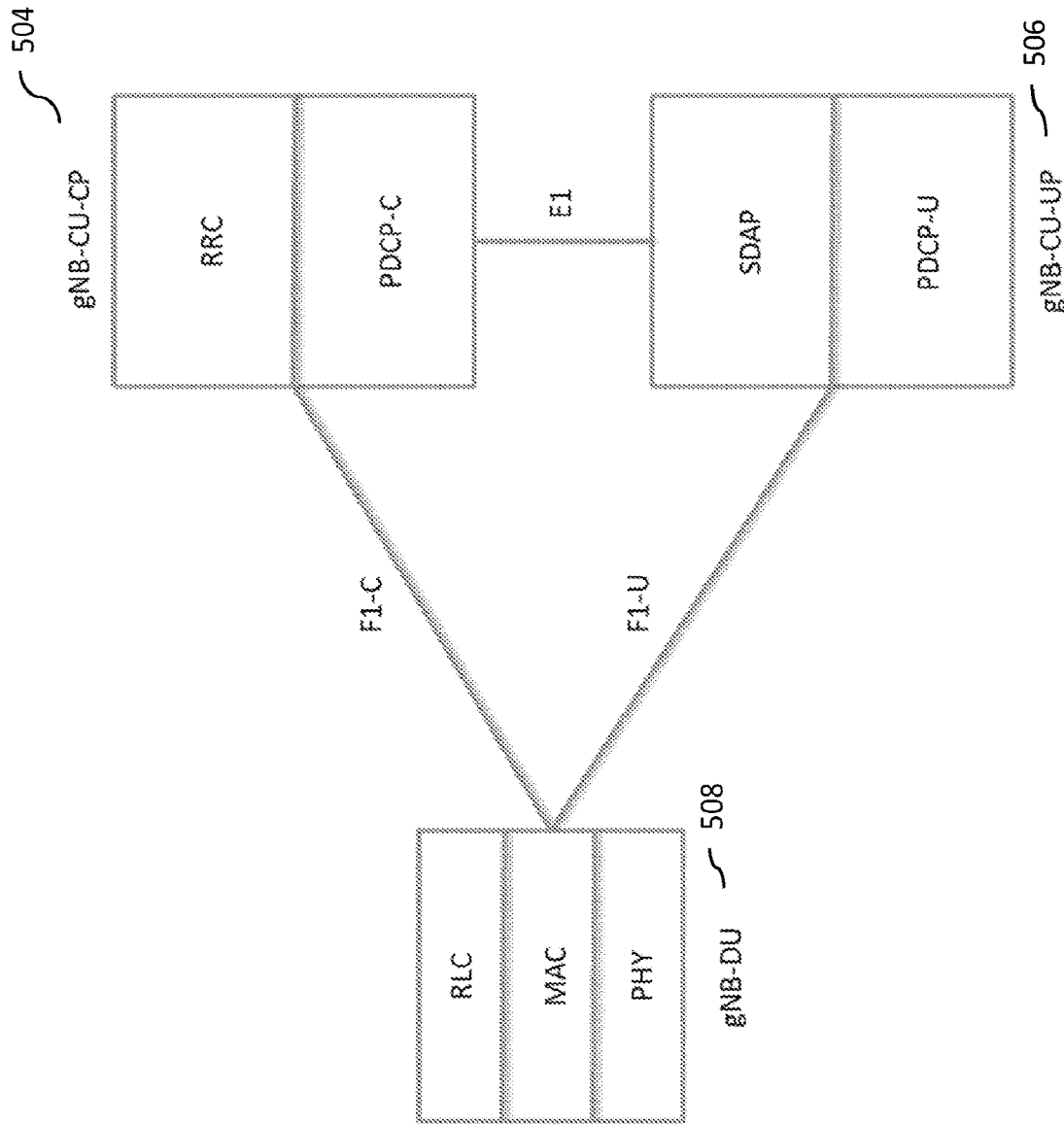
FIG. 5c illustrates an exemplary functional split in the gNB architecture shown in FIGS. 5a-b.

FIG. 5c illustrates an exemplary functional split in the gNB architecture shown in FIGS. 5a-b. As shown in FIG. 5c, the gNB-DU 508 may be communicatively coupled to the gNB-CU-CP 504 and GNB-CU-UP 506 using an F1-C communication interface. The gNB-CU-CP 504 and GNB-CU-UP 506 may be communicatively coupled using an E1 communication interface. The higher part of the PHY layer (or Layer 1) may be executed by the gNB-DU 508, whereas the lower parts of the PHY layer may be executed by the RUs (not shown in FIG. 5c). As shown in FIG. 5c, the RRC and PDCP-C portions may be executed by the control plane portion 504, and the SDAP and PDCP-U portions may be executed by the user plane portion 506.

Some of the functions of the PHY layer in 5G communications network can include error detection on the transport channel and indication to higher layers, FEC encoding/decoding of the transport channel, hybrid ARQ soft-combining, rate matching of the coded transport channel to physical channels, mapping of the coded transport channel onto physical channels, power weighting of physical channels, modulation and demodulation of physical channels, frequency and time synchronization, radio characteristics measurements and indication to higher layers, MIMO antenna processing, digital and analog beamforming, RF processing, as well as other functions.

The MAC sublayer of Layer 2 can perform beam management, random access procedure, mapping between logical channels and transport channels, concatenation of multiple MAC service data units (SDUs) belonging to one logical channel into transport block (TB), multiplexing/demultiplexing of SDUs belonging to logical channels into/from TBs delivered to/from the physical layer on transport channels, scheduling information reporting, error correction through HARQ, priority handling between logical channels of one UE, priority handling between UEs by means of dynamic scheduling, transport format selection, and other functions. The RLC sublayer's functions can include transfer of upper layer packet data units (PDUs), error correction through ARQ, reordering of data PDUs, duplicate and protocol error detection, re-establishment, etc. The PDCP sublayer can be responsible for transfer of user data, various functions during re-establishment procedures, retransmission of SDUs, SDU discard in the uplink, transfer of control plane data, and others.

Layer 3's RRC sublayer can perform broadcasting of system information to NAS and AS, establishment, maintenance and release of RRC connection, security, establishment, configuration, maintenance and release of point-point radio bearers, mobility functions, reporting, and other functions.

III. Scaling of Subscriber Capacity in Cloud Native Radio Access Networks

In some implementations, to address various deficiencies of conventional systems, the current subject matter can be configured to perform scaling of subscriber capacity in a cloud radio access network (RAN), and in particular, to scaling of subscriber capacity in a cloud radio access network (RAN), such as, scaling and/or upgrading of cloud native RAN workloads in a cluster computing environment (such as, for example, Kubernetes computing environment).

Conventional RAN systems do not allow elastically scaling in or scaling out the subscriber and/or throughput capacity(ies) as the user equipment (or, as used interchangeably herein, "mobile subscriber", "subscriber", "mobile user", "user") demand increases or decreases is not present. The existing RAN solutions are typically dimensioned for peak capacity demands. When the capacity falls below such peak, the compute resources can become underutilized. To address these problems, the current subject matter's cloud native RAN system may be configured to allow use of cloud technologies to dynamically scale in (e.g., decrease) and scale out (increase) the processing capacity required as the subscriber demand decreases or increases, respectively. Various cloud native technologies, such as, for example, Kubernetes cluster (e.g., as available from Cloud Native Computing Foundation) and container monitoring system, Prometheus (e.g., a metric pipeline), may exist for monitoring and generalized workflows for scaling in and out cloud native software applications, such technologies do not currently allow use or implementations of RAN workloads.

Kubernetes is an open-source container orchestration system for automating software deployment, scaling, and management. It defines a set of building blocks (or "primitives")

that provide deployment, maintenance, and scaling mechanisms on CPU, memory, and/or various other metrics. The Kubernetes environment is extensible to meet different workloads, where its internal components, extensions and containers rely on various Kubernetes application programming interfaces (APIs). Kubernetes controls compute and storage resources by defining resources as objects that can be managed. In Kubernetes, a pod can be defined as a basic scheduling unit and includes one or more containers that are guaranteed to be co-located on the same node. Each pod is assigned a unique IP address within the cluster and allows applications to use ports without risking conflict. Moreover, a pod defines a volume, e.g., a local disk directory or a network disk, and exposes it to the containers in the pod. Kubernetes also defines a StatefulSet for grouping application pods that are stateful in nature (e.g., a database can be an example of a stateful workload). Stateful workloads are harder, because the state needs to be preserved if a pod is restarted. If the application is scaled up or down, the state may need to be redistributed. StatefulSets can be referred to as controllers (e.g., reconciliation loops that drive an actual cluster state toward a desired state) that enforce the properties of uniqueness and ordering among instances of a pod and are used to execute stateful applications. RAN applications are typically stateful in nature. As stated above, while Kubernetes supports scaling of applications pods in the StatefulSet, it restricts such scaling in the pods by requiring a reverse order of scaling out.

Additionally, conventional RAN systems have a custom in-service software upgrade solutions implemented. In contrast, cloud native RAN solutions allow the flexibility to perform a rolling upgrade of software with a minimal service interruption.

In some implementations, the current subject matter may be configured to provide for an automatic scaling in and/or scaling out of subscriber capacity in cloud computing environment (e.g., Kubernetes) and for sequencing rolling software upgrades for at various RAN network functions, which may include one or more of the following: eNB, ng-eNB and/or gNB centralized unit—control plane function(s) (ng-eNB-CU-CP, eNB-CU-CP and/or gNB-CU-CP, respectively), eNB, ng-eNB, and/or gNB centralized unit—user plane function(s) (ng-eNB-CU-UP, eNB-CU-UP and/or gNB-CU-UP, respectively). For scaling out, the current subject matter may be configured to overcome the above-mentioned restriction in Kubernetes.

In particular, for automatic scaling out and/or scaling in of subscriber handling capacity in cloud native RAN, the current subject matter may be configured to execute one or more of the following operations: monitoring of subscriber capacity (e.g., monitoring one or more metrics, exporting one or more monitored metrics to Kubernetes API server via a container monitoring system (e.g., Prometheus) adapter/custom metrics server, querying exported metrics (e.g., using Kubernetes horizontal pod autoscaler (HPA)), and determining (e.g., using a policy in the HPA) whether to scale out and/or scale in of pods to handle the increased/decreased subscriber capacity, respectively.

To address restrictions in Kubernetes, the current subject matter may be configured to use one or more Kubernetes operators for customizing a scale in order of pods, draining out (e.g., removing) mobile subscribers from a lightly loaded pod to free up capacity and release it, i.e., thereby performing a scale in of capacity.

Additionally, to perform rolling upgrades of pods in a cloud native RAN (and accounting for various dependencies in the pods), the current subject matter may be configured to execute a sequential upgrading of the pods using one or more Kubernetes operators, and maintain a backwards compatibility between pods of a previous release and upgraded pods of a new release.

Figure 6:
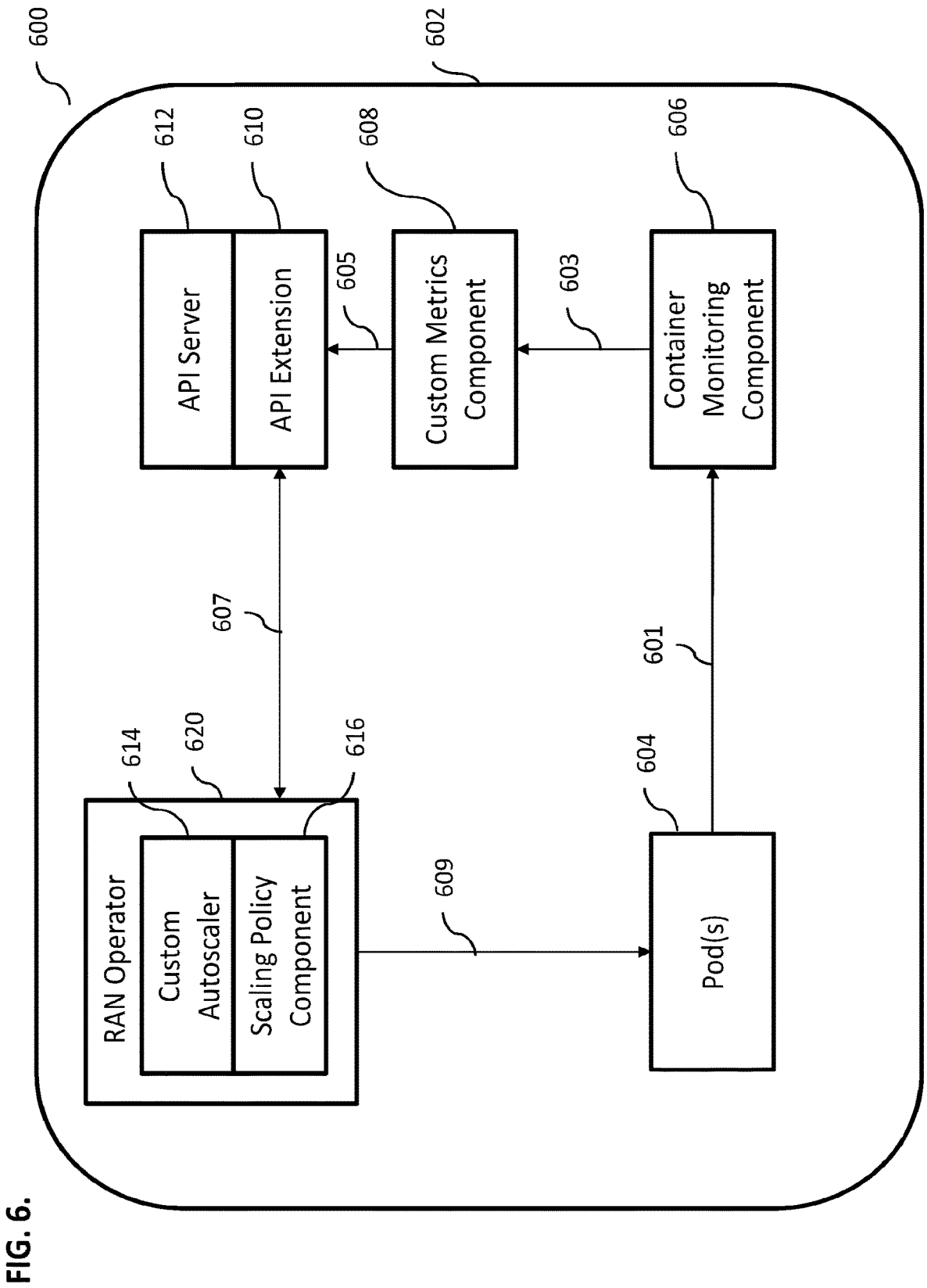
FIG. 6 illustrates an exemplary system for automatically scaling out and/or scaling in of mobile subscriber capacity in cloud radio access networks, according to some implementations of the current subject matter.

FIG. 6 illustrates an exemplary system 600 for automatically scaling out and/or scaling in of mobile subscriber capacity in cloud radio access networks, according to some implementations of the current subject matter. In particular, the current subject matter may be configured to perform such scaling using one or more pods of a clustered computing environment (e.g., Kubernetes) in control plane components of centralized units (e.g., ng-eNB-/eNB-/gNB-CU-CP) and/or user plane components of centralized units (e.g., ng-eNB-/eNB-/gNB-CU-UP). The pods may be designed to handle processing of one or more mobile subscribers that may be communicatively coupled via such control/user plane components.

As shown in FIG. 6, the system 600 may be incorporated into a component 602, such as, for example, but not limited to, an eNB, a ng-eNB, gNB, and/or any other type of base station and/or any portion(s) thereof, a radio access network component and/or any portion(s) thereof, a computing cluster and/or any portion(s) thereof, and/or any other component, and/or any combination thereof. In some exemplary, non-limiting, implementations, the system 600 may be incorporated into one or more centralized units of such base stations. In some further exemplary implementations, the system 600 may be incorporated into one or more control plane components and/or user plane components of the centralized units.

The system 600 may include one or more pods 604, a container monitoring component 606, a custom metrics server 608, an application programming interface (API) server 612 and an API extension component 610, a radio access network (RAN) operator component 620 that may include a pod autoscaler component 614, and a scaling policy component 616.

One or more pods 604 may be associated with a predetermined user equipment handling capacity, e.g., a predetermined number of user equipments that it can process, such as, during and/or at a particular period of time. The number of user equipments may be adjustable and may be predetermined based on specific setting of the communication system, processing capabilities, and/or any other factors. Alternatively or in addition, one or more pods 604 may be associated with a predetermined processing capacity. The processing capacity may be adjustable and may be predetermined based on specific setting of the communication system, processing capabilities, and/or any other factors.

The pod(s) 604 may be configured to provide, at 601, various capacity related metrics to the container monitoring component 606. In some exemplary implementations, the metrics may include, but are not limited to, at least one of the following: a number of radio resource control (RRC) connected subscribers associated within a particular pod 604, a number of RRC connected and RRC inactive subscribers associated with a particular pod 604, a weighted average of RRC subscribers and RRC inactive subscribers associated with a particular pod 604, an average throughput, a number of data radio bearers (DRBs), and any combination thereof. Alternatively, or in addition, the container monitoring component 606 may be configured to query and "scrape", at 601, one or more of the above metrics. Moreover, the metrics may be obtained from gNB/eNB CU-CP and/or CU-UP components associated with one or more mobile subscribers that are being handled by one or more pods 604 in the clustered computing environment.

In some implementations, one or more specific metrics may be queried, at 603, by the custom metrics component 608. The metrics may be exported, at 605, to the API server 612 via an appropriate API extension 610, where the server 612 and extension 610 may be associated with a particular computing cluster and/or container As stated above the RAN operator component 620 (which will be discussed in more detail below) may include the pod autoscaler component 614 that may be configured to include a horizontal pod autoscaler (HPA) that may query, at 607, any custom metrics that may have been obtained by the API server 612. In some exemplary implementations, the component 614 may query at least one of the following metrics from the API server 612 (via the API extension 610): a subscriber capacity count, a throughput, a DRB count, and any other metrics and/or any combination thereof.

The metrics that may be provided by the component 614 to the scaling policy component 616 within the RAN operator component 620, may be used by the component 616 to determine a particular scaling policy, such as for example, a scale-in (e.g., reducing the number of pods 604 for providing communications to one or more user equipments) policy and/or scale-out (e.g., increasing the number of pods 604 for providing communications to one or more user equipments) policy. The policy may be used to determine how to scale in (e.g., decrease) and/or scale out (e.g., increase) subscriber handling pods in control plane components and/or user plane components of centralized units of ng-eNB, eNB and/or gNB.

Figure 7A:
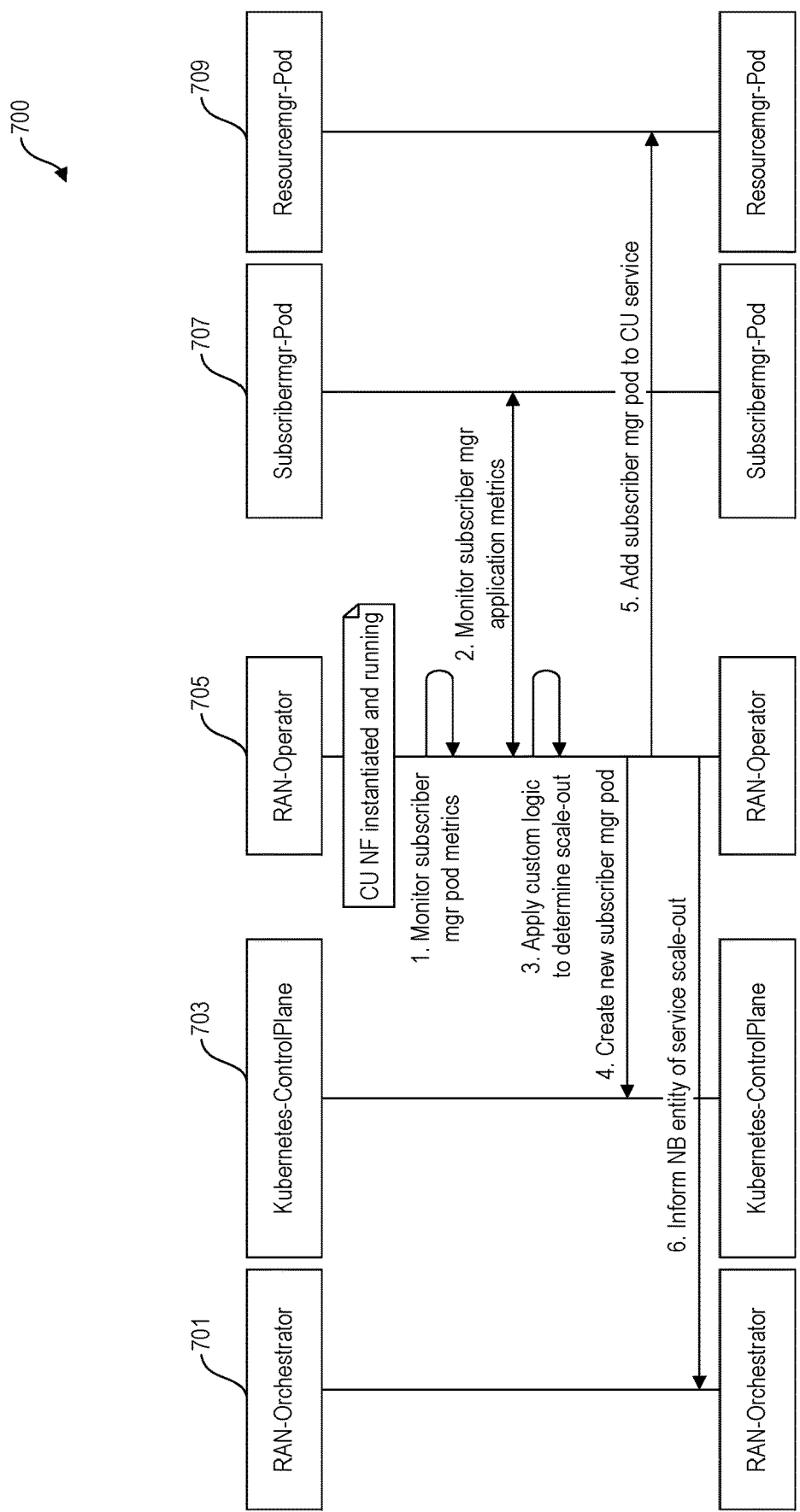
FIG. 7a illustrates an exemplary scaling out (e.g., increasing processing capacity) process, according to some implementations of the current subject matter.
Figure 7B:
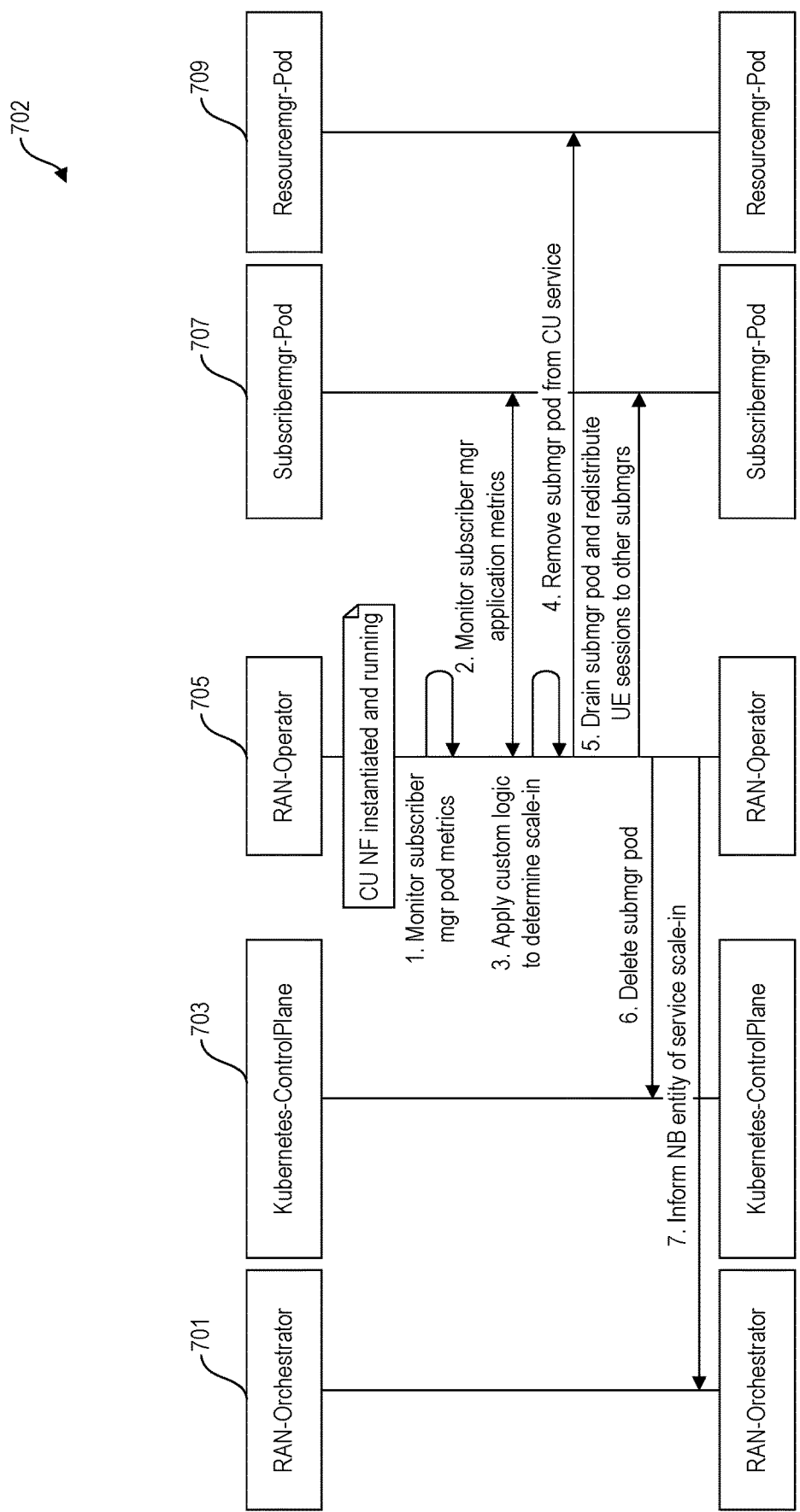
FIG. 7b illustrates an exemplary scaling in (e.g., decreasing processing capacity) process, according to some implementations of the current subject matter.

FIGS. 7*a-b* illustrate exemplary scaling processes that may be executed by the system 600 shown in FIG. 6. In particular, FIG. 7*a* illustrates an exemplary scaling out (e.g., increasing processing capacity) process 700, according to some implementations of the current subject matter. FIG. 7*b* illustrates an exemplary scaling in (e.g., decreasing processing capacity) process 702, according to some implementations of the current subject matter.

Referring to FIG. 7*a*, the process 700 may be executed using a radio access network (RAN) orchestrator component 701, a control plane 703 of a clustered computing environment (e.g., Kubernetes), a RAN operator component 705 (similar to the RAN operator component 620 shown in FIG. 6), a subscriber manager component 707 of a pod (e.g., pod 604 shown in FIG. 6) and a resource manager component 709 of a pod (e.g., pod 604). The components 701-709 may include any combination of hardware and/or software. In some implementations, such components may be disposed on one or more computing devices, such as, server(s), database(s), personal computer(s), laptop(s), cellular telephone(s), smartphone(s), tablet computer(s), and/or any other computing devices and/or any combination thereof. In some implementations, these components may be disposed on a single computing device and/or multiple computing devices. Alternatively, or in addition to, the components may be separately located from one another.

The RAN operator component 705 may be configured to be instantiated and running in a centralized unit (e.g., as part of a centralized unit network function (CU NF)) of the base station and/or, for example, but not limited to, an eNB, a ng-eNB, gNB, and/or any other type of base station and/or any portion(s) thereof, a radio access network component and/or any portion(s) thereof, a computing cluster and/or any portion(s) thereof, and/or any other component, and/or any combination thereof (e.g., but not limited to, component 602 shown in FIG. 6). In some implementations, the component 705 may be configured to execute monitoring of a processing capacity of the pod 604 and/or, multiple components 705 may be configured to monitor processing capacity (ies) of one or more pods 604. In particular, one or more subscriber manager pod metrics (as described above) and/or one or more application metrics may be obtained from the subscriber manager component 707.

Based on the received metrics, the component 705 may be configured to execute a determination (e.g., in accordance with a particular scaling policy contained in the scaling policy component 616) that a scaling out (e.g., increasing) of processing capacity may be required. In this case, a request may be transmitted to the control plane component 703 to create a new subscriber manager pod 604, such as for example, to accommodate increased processing capacity associated with additional user equipments communicating with the existing pods 604. Once the new subscriber manager pod is created, the component 705 transmits an indication to the resource manager component 709 to add the newly created pod to the centralized unit service capabilities. For instance, any additional user equipments may be assigned to the newly created pod for processing. The component 705 may also inform the orchestrator component 701 that a scale out (i.e., new pod created) has been executed.

FIG. 7*b* illustrates an exemplary scaling in process 702, according to some implementations of the current subject matter. The process 702 may likewise be executed by the RAN orchestrator component 701, the control plane 703 of a cloud computing environment (e.g., Kubernetes), the RAN operator component 705 (again similar to component 620 shown in FIG. 6), the subscriber manager component 707 of a pod (e.g., pod 604 shown in FIG. 6) and the resource manager component 709 of a pod (e.g., pod 604).

As discussed above, the RAN operator component 705 may be configured to be instantiated and running in the centralized unit (e.g., as part of the CU NF) of the base station and/or, for example, but not limited to, an eNB, a ng-eNB, gNB, and/or any other type of base station and/or any portion(s) thereof, a radio access network component and/or any portion(s) thereof, a computing cluster and/or any portion(s) thereof, and/or any other component, and/or any combination thereof (e.g., but not limited to, component 602 shown in FIG. 6). The component 705 may be configured to execute monitoring of a processing capacity of the pod 604 and/or, multiple components 705 may be configured to monitor processing capacity(ies) of one or more pods 604 to determine whether decrease in capacity may be required. In particular, one or more subscriber manager pod metrics (as described above) and/or one or more application metrics may be obtained from the subscriber manager component 707.

Based on the received metrics, the component 705 may be configured to execute a determination (e.g., in accordance with a particular scaling policy contained in the scaling policy component 616) that a scaling in (e.g., decreasing) of processing capacity may be required. For example, RRC status of various user equipments being processed by the pod may indicate that reduction of capacity may be warranted. The component 705 then transmits a request to the resource manager component 709 to request removal of the subscriber manager pod (e.g., the pod that needs to be removed due to reduced capacity) from centralized unit service. The component 705 along with the subscriber manager component 707 may remove or "drain" out any user equipments from the affected pod and/or re-distribute those removed user equipments to one or more other pods 604.

Once the removal of user equipments is completed, the component 705 may also transmit an indication to the control plane component 703 to delete the pod. The component 705 may inform the orchestrator component 701 that a scale in (i.e., a pod being deleted) has been executed.

In some implementations, the system 600 shown in FIG. 6 may be configured to execute one or more upgrades to one or more resources that may be available for servicing user equipments by one or more pods 604 in the cloud computing environment. Multiple upgrades may be executed using a predetermined sequence and monitored using one or more key performance indicators (KPIs). Moreover, any upgrades (e.g., upgrades to one or more pods) that do not meet such KPIs may be rolled back.

Figure 8:
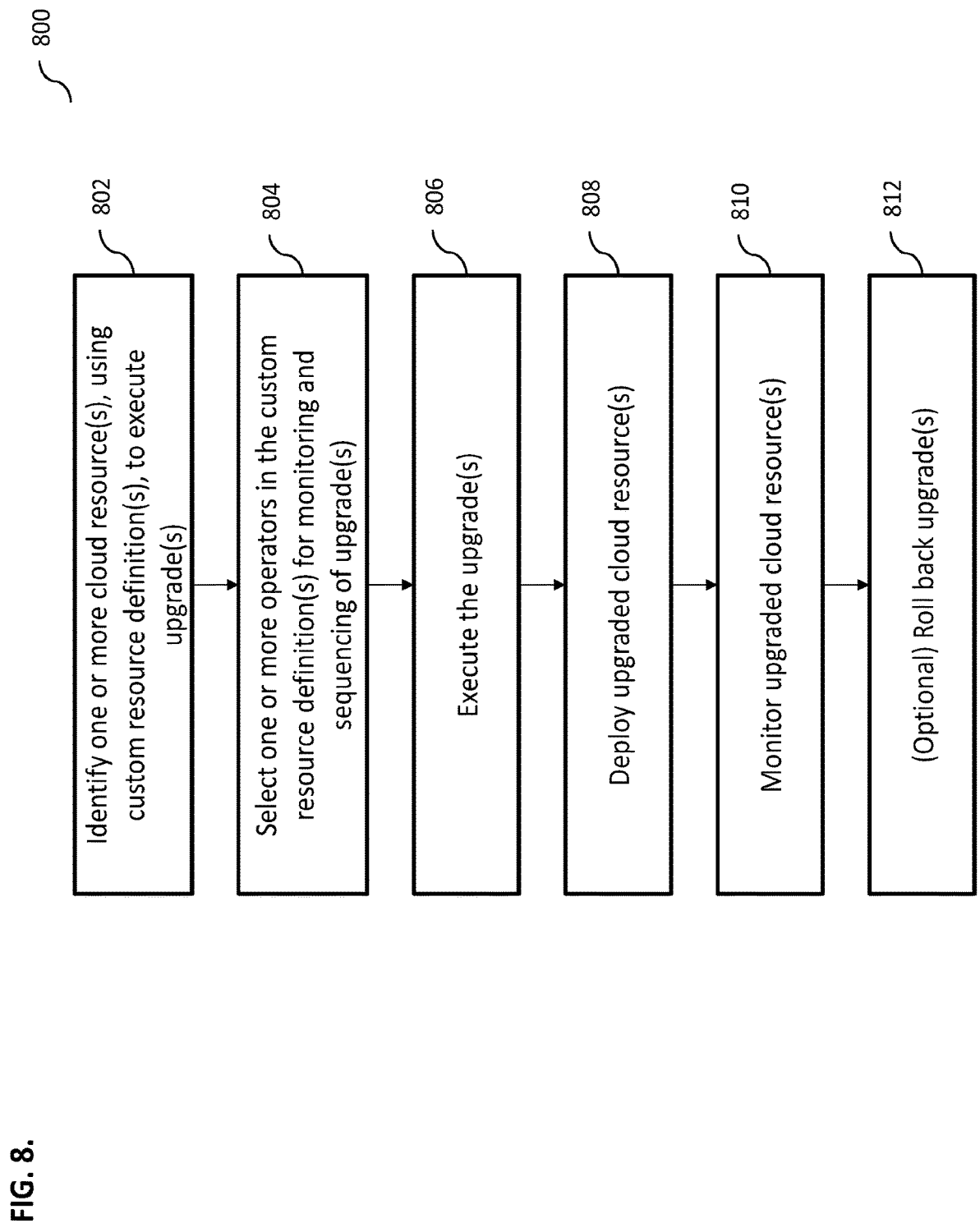
FIG. 8 illustrates an exemplary system for performing a sequenced upgrade of pods in a clustered cloud radio access network environment, according to some implementations of the current subject matter.

FIG. 8 illustrates an exemplary process 800 for executing one or more upgrades of one or more pods 604 in a clustered cloud radio access network environment, according to some implementations of the current subject matter. At 802, one or more cloud resource(s) (e.g., pods 604) may be identified for the purposes of receiving an upgrade (e.g., a software upgrade, a communication parameter upgrade, etc. and/or any other types of upgrades). A custom resource definition (CRD) may be used to identify such cloud resources (pods) for execution of an upgrade. In some implementations, any upgrades may be rolling upgrades that may be applied in a particular sequence.

At 804, the custom resource definitions may be used to identified and/or select one or more operators for monitoring and/or sequencing of upgrades. At 806, the upgrade(s) to the cloud resources (e.g., pods 604) may be executed and applied to identified cloud resources.

Once the upgrades are applied, the upgraded resources (pods) may be deployed, at 808, for providing communications to user equipments. The upgraded resources may be monitored, at 810. Monitoring may be performed, at 812, using one or more key performance indicators (KPIs). Such KPIs may relate to processing capacity, throughput, etc. The selected custom operators may optionally be used to roll back of any such upgrades, at 812, if the KPIs are not met.

Figure 9:
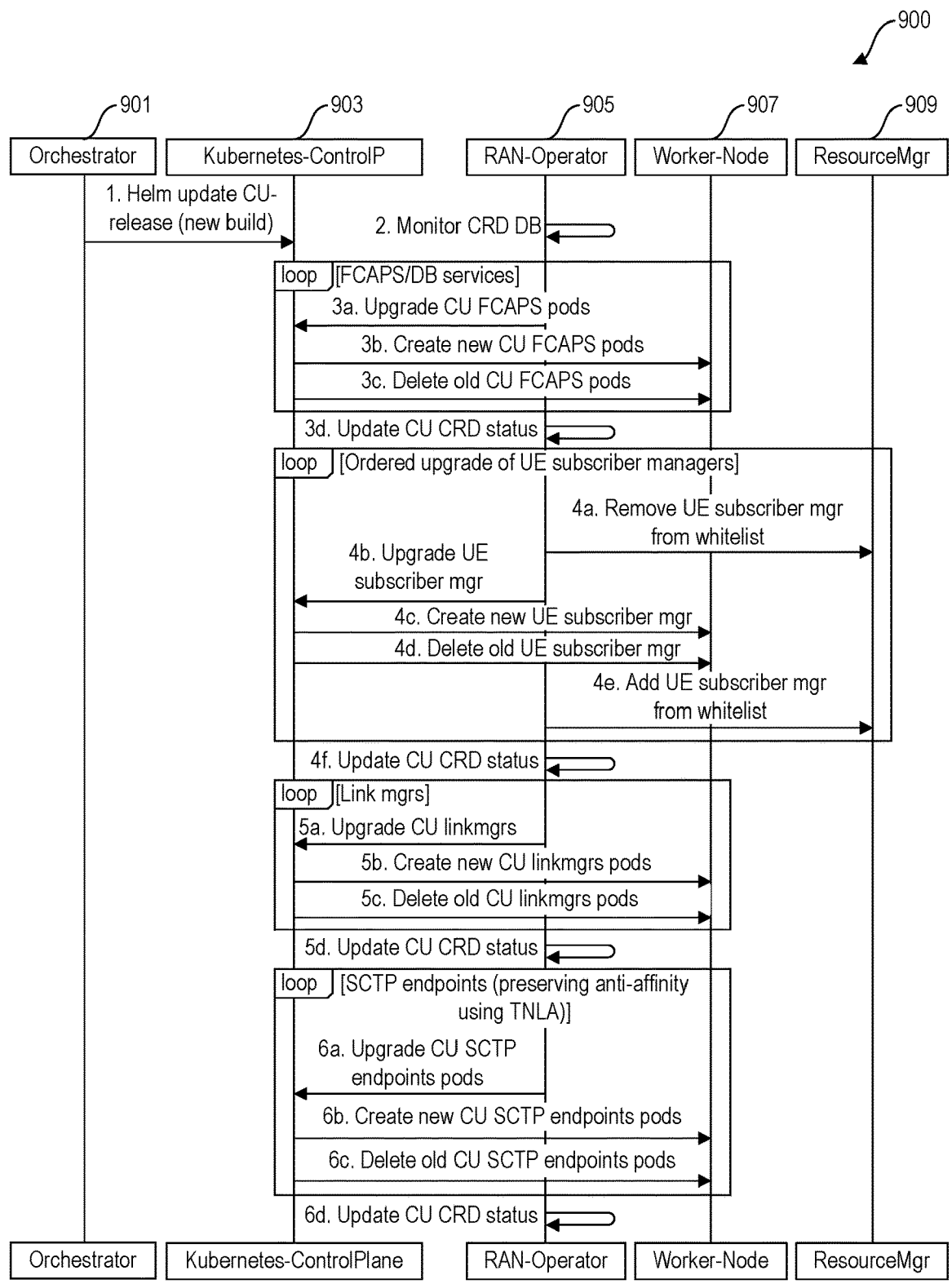
FIG. 9 illustrates an exemplary process for executing a sequence of resources to be upgraded in a eNB or gNB CU-CP or CU-UP, according to some implementations of the current subject matter.

FIG. 9 illustrates an exemplary process 900 for executing a sequential upgrade of resources in CU-CP and/or CU-UP of ng-eNB, eNB and/or gNB, according to some implementations of the current subject matter. The process may be executed by an orchestrator (e.g., a RAN orchestrator) 901, a control plane component 903 of a clustered computing environment (e.g., Kubernetes), a RAN operator component 905 (which may be similar to component 620 shown in FIG. 6 and/or component 705 shown in FIGS. 7a-b), a worker node component 907, and a resource manager component 909.

The process 900 may be initiated by the orchestrator 901 upon receiving an update to a centralized unit release software (e.g., a Helm update) that may correspond to a new build. This information is then provided to the control plane component 903 and may cause the operator component 905 to perform monitoring of any custom resource definition as well as execute one or more loops relating to the upgrades associated with the received new build.

In particular, the component 905 may execute a first loop relating to the upgrade of FCAPS (fault, configuration, accounting, performance and security) and/or any database services. The component 905 may indicate to the control plane component 903 that an upgrade of centralized unit FCAPS pods (3a) is being executed. In response, the control plane component 903 may request the worker node 907 to create new CU FCAPS pods (3b) and delete old ones (3c). This process may be repeated for each new CU FCAPS pod. The component 905 may then update the CU CRD status.

A second loop executed by the component 905 may involve an ordered upgrade to the user equipment subscriber managers. The component 905 may indicate to the resource manager component 909 to remove (4a) an old subscriber manager from a list (e.g., a whitelist) of subscriber managers that may be used by user equipments and request (4b) the control plane component 903 to upgrade the user equipment subscriber manager. In turn, the component 903 may request the worker node 907 to create (4c) a new user equipment subscriber manager and delete (4d) an old user equipment subscriber manager. Then, the component 905 may request (4e) the resource manager to add the created user equipment subscriber manager to the list. The component 905 may then update the CU CRD status.

A third loop may involve an upgrade to the communication link managers. The component 905 may request (5a) the control plane component 903 to upgrade the link manager pod. In turn, the component 903 may request the worker node 907 to create (5b) a new link manager pod and delete (5c) an old link manager pod. The component 905 may then update the CU CRD status.

A fourth loop may include updates to any SCTP endpoints. The component 905 may request (6a) the control plane component 903 to upgrade the SCTP endpoints pods. In turn, the component 903 may request the worker node 907 to create (6b) a new SCTP endpoints pod and delete (6c) an old SCTP endpoints pod. The component 905 may then update the CU CRD status.

in some implementations, when performing rolling upgrades pod by pod in a Kubernetes cluster, it is possible that some of the pods may be running using a previous version of a software while the upgraded pods may be running using a new version. If there are interface level changes between the previous version and upgraded version in the pod to pod communication, it may lead to compatibility issues. Thus, whenever interface between pods are updated from one version of the software to the next version, backwards compatibility may be maintained. This may be achieved by keeping a version number field in the pod to pod messaging interface. Every pod that is upgraded may support the previous version interface as well. Whenever an upgraded pod communicates with a previous version pod, the upgraded pod may learn the interface version supported by the previous version pod and based on that it may use the older version interface to communicate with that pod.

Figure 10:
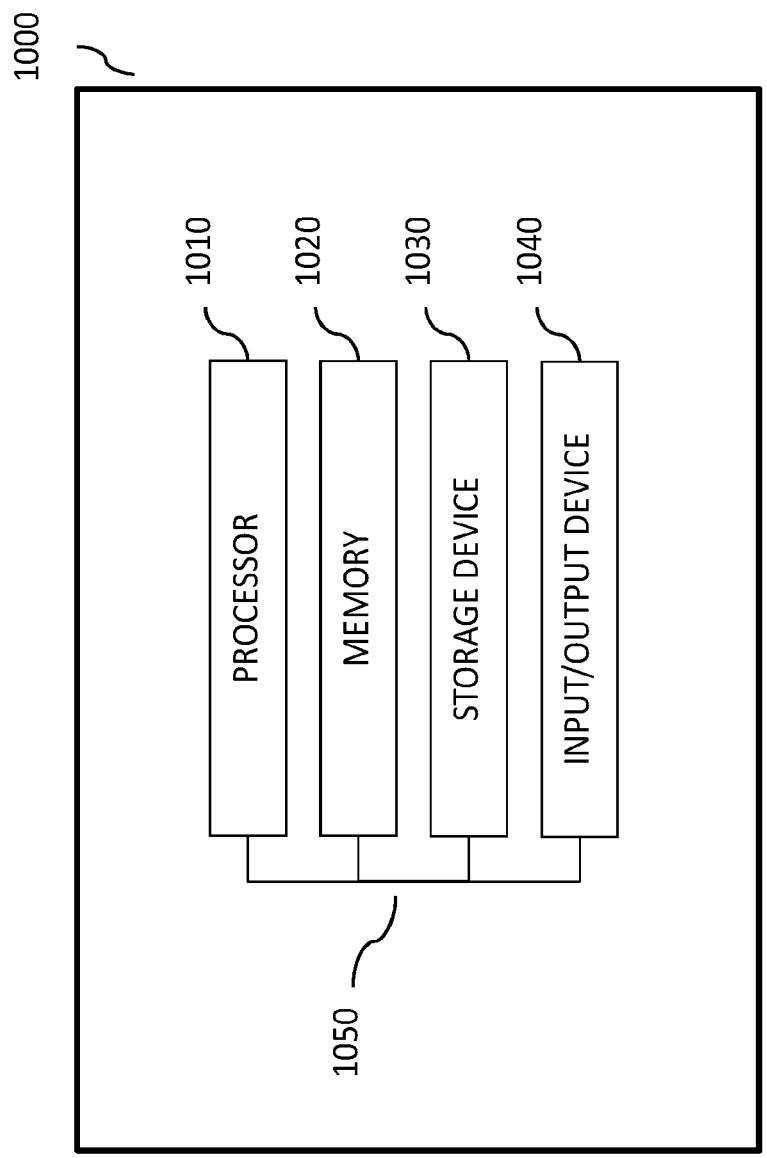
FIG. 10 illustrates an exemplary system, according to some implementations of the current subject matter.

In some implementations, the current subject matter can be configured to be implemented in a system 1000, as shown in FIG. 10. The system 1000 can include one or more of a processor 1010, a memory 1020, a storage device 1030, and an input/output device 1040. Each of the components 1010, 1020, 1030 and 1040 can be interconnected using a system bus 1050. The processor 1010 can be configured to process instructions for execution within the system 600. In some implementations, the processor 1010 can be a single-threaded processor. In alternate implementations, the processor 1010 can be a multi-threaded processor. The processor 1010 can be further configured to process instructions stored in the memory 1020 or on the storage device 1030, including receiving or sending information through the input/output device 1040. The memory 1020 can store information within the system 1000. In some implementations, the memory 1020 can be a computer-readable medium. In alternate implementations, the memory 1020 can be a volatile memory unit. In yet some implementations, the memory 1020 can be a non-volatile memory unit. The storage device 1030 can be capable of providing mass storage for the system 1000. In some implementations, the storage device 1030 can be a computer-readable medium. In alternate implementations, the storage device 1030 can be a floppy disk device, a hard disk device, an optical disk device, a tape device, non-volatile solid state memory, or any other type of storage device. The input/output device 1040 can be configured to provide input/output operations for the system 1000. In some implementations, the input/output device 1040 can include a keyboard and/or pointing device. In alternate implementations, the input/output device 1040 can include a display unit for displaying graphical user interfaces.

Figure 11:
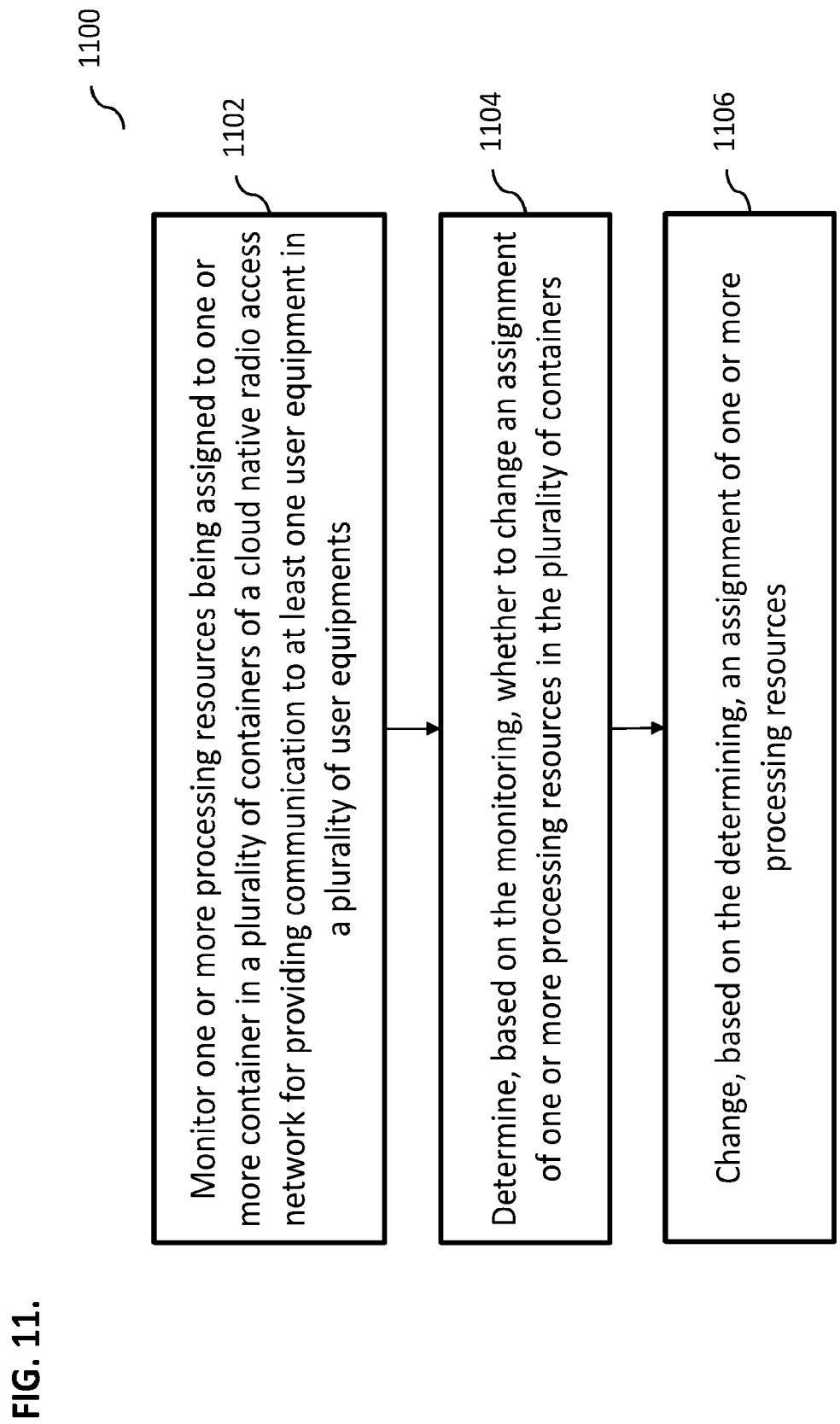
FIG. 11 illustrates an exemplary method, according to some implementations of the current subject matter.

FIG. 11 illustrates an exemplary method 1100 for scaling of one or more processing resources in a wireless communication system, according to some implementations of the current subject matter. The method 1100 may be performed using system 600 shown in FIG. 6 as well as using any of the concepts shown and described in connection with FIGS. 7*a*-9. At 1102, the system 600 may perform monitoring of one or more processing resources being assigned to one or more containers (e.g., a pod 604) in a plurality of containers of a cloud native radio access network for providing communication to at least one user equipment in a plurality of user equipments.

At 1104, the system 600 may determine, based on the monitoring, whether to change an assignment of one or more processing resources in the plurality of containers. This information may be based on various metrics that may be obtained from one or more pods.

At 1106, the system 600 may be configured to change, based on the determining, the assignment of one or more processing resources.

In some implementations, the current subject matter can include one or more of the following optional features. In some implementations, the plurality of containers may be configured to operate in a clustered computing environment (e.g., Kubernetes).

In some implementations, at least one of the monitoring, the determining, and the changing may be performed by at least one base station in a wireless communication system. The base station may include at least one of the following: a base station, an eNodeB base station, a gNodeB base station, a wireless base station, a wireless access point, and any combination thereof. The base station may be a base station operating in at least one of the following communications systems: a long term evolution communications system, a new radio communications system, a wireless communication system, and any combination thereof. The base station may include at least one centralized unit, the centralized unit include at least one of: a control plane component, a user plane component, and any combination thereof.

In some implementations, one or more user equipments in the plurality of user equipments may be associated with a radio resource control (RRC) status. The RRC status may include at least one of the following: an RRC-inactive status, RRC-IDLE status, an RRC connected status, and any combination thereof.

In some implementations, the monitoring may include monitoring one or more metrics associated with the one or more processing resources. The metrics may include at least one of the following: a number of user equipments being processed by at least one container, a throughput associated with processing of at least one user equipment by at least one container, one or more data radio bearers associated with at least one user equipment, and any combination thereof.

In some implementations, at least one container may be associated with at least one of: at least one control plane component and at least user plane component of a centralized unit of a base station.

In some implementations, the method may include upgrading one or more processing resources using one or more resource definitions associated with one or more upgrades. Upgrading may include executing one or more upgrades using one or more upgrade sequences.

In some implementations, the changing may include changing the assignment of one or more processing resources using one or more resource definitions associated with one or more control plane and user plane components of a centralized unit of a base station.

In some implementations, the changing may include executing one or more changing of the assignment of the one or more processing resources operations using one or more changing sequences.

In some implementations, the method may also include deploying one or more upgraded resources, monitoring the deployed upgraded resources using one or more key performance indicators, and rolling back one or more deployed upgrades to the processing resources upon determining that the deployed upgraded processing resources do not meet one or more key performance indicators.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed is:

1. A computer-implemented method, comprising:
monitoring one or more processing resources being assigned to one or more containers in a plurality of containers of a cloud native radio access network for providing communication to at least one user equipment in a plurality of user equipments;
determining, based on the monitoring, whether to change an assignment of the one or more processing resources in the plurality of containers;
changing, based on the determining, the assignment of the one or more processing resources;
upgrading the one or more processing resources using one or more resource definitions associated with one or more upgrades;
deploying the one or more upgraded processing resources;
monitoring the one or more deployed upgraded processing resources using one or more key performance indicators; and
rolling back one or more deployed upgrades to the one or more processing resources upon determining that the one or more deployed upgraded processing resources do not meet the one or more key performance indicators.

2. The method according to claim 1, wherein the plurality of containers are configured to operate in a cloud computing environment to provide one or more services of at least one control plane component and at least user plane component of a centralized unit of a base station.

3. The method according to claim 1, wherein at least one of the monitoring, the determining, and the changing is performed by at least one base station in a wireless communication system.

4. The method according to claim 3, where the base station includes at least one of the following: a base station, an eNodeB base station, a gNodeB base station, a wireless base station, a wireless access point, and any combination thereof.

5. The method according to claim 4, wherein the base station is a base station operating in at least one of the following communications systems: a long term evolution communications system, a new radio communications system, a wireless communication system, and any combination thereof.

6. The method according to claim 5, wherein the base station includes at least one centralized unit, the centralized unit include at least one of: a control plane component, a user plane component, and any combination thereof.

7. The method according to claim 1, wherein one or more user equipments in the plurality of user equipments in the plurality of user equipments is associated with a radio resource control (RRC) status, the RRC status including at least one of the following: an RRC-inactive status, RRC-IDLE status, an RRCE connected status, and any combination thereof.

8. The method according to claim 1, wherein the monitoring includes monitoring one or more metrics associated with the one or more processing resources.

9. The method according to claim 8, wherein the one or more metrics include at least one of the following: a number of user equipments being processed by the at least one container, a throughput associated with processing of at least one user equipment by the at least one container, one or more data radio bearers associated with the at least one user equipment, and any combination thereof.

10. The method according to claim 1, wherein the at least one container is associated with at least one of: at least one control plane component and at least user plane component of a centralized unit of a base station.

11. The method according to claim 1, wherein the upgrading includes executing the one or more upgrades using one or more upgrade sequences.

12. The method according to claim 1, wherein the changing including changing the assignment of the one or more processing resources using one or more resource definitions associated with one or more control plane and user plane components of a centralized unit of a base station.

13. The method according to claim 1, wherein the changing includes executing one or more changing of the assignment of the one or more processing resources operations using one or more changing sequences.

14. An apparatus, comprising:
at least one processor, and
at least one non-transitory storage media storing instructions that, when executed by the at least one processor, cause the at least one processor to perform operations comprising:
monitoring one or more processing resources being assigned to one or more containers in a plurality of containers of a cloud native radio access network for providing communication to at least one user equipment in a plurality of user equipments;
determining, based on the monitoring, whether to change an assignment of the one or more processing resources in the plurality of containers;
changing, based on the determining, the assignment of the one or more processing resources;
upgrading the one or more processing resources using one or more resource definitions associated with one or more upgrades;
deploying the one or more upgraded processing resources;
monitoring the one or more deployed upgraded processing resources using one or more key performance indicators; and
rolling back one or more deployed upgrades to the one or more processing resources
upon determining that the one or more deployed upgraded processing resources do not meet the one or more key performance indicators.

15. At least one non-transitory story media storing instructions that, when executed by at least one processor, cause the at least one processor to perform operations comprising:
monitoring one or more processing resources being assigned to one or more containers in a plurality of containers of a cloud native radio access network for providing communication to at least one user equipment in a plurality of user equipments;
determining, based on the monitoring, whether to change an assignment of the one or more processing resources in the plurality of containers;
changing, based on the determining, the assignment of the one or more processing resources;
upgrading the one or more processing resources using one or more resource definitions associated with one or more upgrades;
deploying the one or more upgraded processing resources;
monitoring the one or more deployed upgraded processing resources using one or more key performance indicators; and
rolling back one or more deployed upgrades to the one or more processing resources
upon determining that the one or more deployed upgraded processing resources do not meet the one or more key performance indicators.

* * * * *